United States Patent [19]

Handley et al.

[11] Patent Number: 4,926,392

[45] Date of Patent: May 15, 1990

[54] METHOD AND APPARATUS FOR OBTAINING SEISMIC VIBRATOR REFLECTION DATA

[75] Inventors: George E. Handley, Golden, Colo.; A. M. Moore, Houston, Tex.; Robert E. Dickman, Evergreen, Colo.

[73] Assignee: Hand Geophysical, Houston, Tex.

[21] Appl. No.: 143,927

[22] Filed: Jan. 14, 1988

Related U.S. Application Data

[63] Continuation-in-part of Ser. No. 910,446, Sep. 22, 1986, abandoned.

[51] Int. Cl.$^5$ .............................................. G01V 1/28
[52] U.S. Cl. ........................................ 367/59; 367/41; 364/421
[58] Field of Search ....................... 367/39, 40, 41, 42, 367/59, 37, 38; 364/421

[56] References Cited

U.S. PATENT DOCUMENTS 3,863,057 1/1975 Siems .................................... 367/41

OTHER PUBLICATIONS

Handley, "Vibrolokator Method of Interpreting Seismograms from Vibrator Energy Sources", Thesis T-2082, 1978, Colorado School of Mines.

Primary Examiner—Ian J. Lobo
Attorney, Agent, or Firm—Vinson & Elkins

[57] ABSTRACT

A method and apparatus for obtaining seismic vibrator reflection data is disclosed with a significant signal to noise ratio. The earth is sinusoidally vibrated with source vibrations linearly varying over time. The amplitudes of the reflections from the subsurface strata interfaces are sensed and multiplied by the amplitude of the source vibrations, resulting in a first representation of the product as a function of time. A second representation of the product is calculated in association with negative values of time, such that phase consistency between the two representations is maintained. The two representations are then mathematically combined, with values of zero associated with all other values of time. The two representations are then linearly transformed into a function of frequency, and loaded into an array for computer operation. An inverse Fourier transform is the performed on the combined representations as a function of frequency, resulting in a timedomain representation of the combined representations indicating the delay times between the source vibrations and the sensed reflections. After various mathematical steps, the waveform is displayed in a form adapted to geophysical analysis.

41 Claims, 23 Drawing Sheets

METHOD AND APPARATUS FOR OBTAINING SEISMIC VIBRATOR REFLECTION DATA

CROSS REFERENCE TO RELATED APPLICATION

This application is a continuation-in-part of applicants' U.S. Ser. No. 910,446, now abandoned filed Sept. 22, 1986, and entitled Method and Apparatus for Obtaining Seismic Vibrator Reflection Data.

This invention relates to the recording of seismic data into an easily interpretable form, as used in exploration for underground oil and gas reservoirs.

BACKGROUND OF THE INVENTION

Various techniques have been used in attempting to map subsurface geological strata and formations to locate likely traps for the accumulation of hydrocarbons. Among these techniques is the technique by which seismic pressure waves are generated at a predetermined location near the earth's surface, with measurements of the reflections of the seismic waves from interfaces between subsurface geological strata occurring at various depths. By determining the time delays between the sourcing of a given seismic wave and its reflections (i.e., the "two-way times"), and by taking into account the velocity of the seismic waves in the various strata and the spatial relationship of the measurement locations to the source, information about the depth and lithology of the various strata interfaces can be developed.

In practice, methods of creating the seismic waves on land include the exploding of dynamite, the dropping of a large weight, and the use of mechanical vibrators. With dynamite, weights, and other types of single impulse sources, a large amount of energy is input into the earth within a brief period of time, allowing discrete reflections to be easily measured. However, the wide and uncontrolled source yields an equally uncontrolled frequency spectrum of noise, adversely affecting the signal-to-noise ratio of such a system and thereby adversely affecting the resolution of the system. In addition, the use of dynamite and other explosives introduce obvious safety and ecological risks.

Use of a continuous source, such as a mechanical vibrator, combats the disadvantages of the single impulse sources by controlling the frequency bandwidth of the vibrations, thereby controlling the bandwidth of any resultant noise. However, since the input waves from a continuous source continue over a period of time, the detection of discrete reflections becomes somewhat more difficult. This is because the reflections from the later portion of the input vibration in turn occur later and overlap signals from deeper reflections, which prevents individual reflections from being as easily identified. Therefore, significant computer hardware and computational time are required to interpret the data and identify the time delays of the reflections.

A popular technique, namely the VIBROSEIS* [*Registered trademark of Continental Oil Company] technique, includes the use of a vibrator source, controlled at the recording unit, which provides a "sweep" or "chirp" consisting of seismic vibrations of varying frequency over a period of time. An electrical signal representative of the source vibrations is recorded by the recording unit. A series of, geophones are placed at a plurality of stations having common increment surface distances apart from the vibrator, and individually sense the reflection of the input sweep from the subsurface strata interfaces. The data sensed by each geophone therefore is the input sweep signal attenuated in amplitude and delayed in time as it is reflected from the subsurface strata interfaces and is input to the recording unit; the data recorded by the recording unit, therefore, is the input sweep signal itself as well as the signal from each geophone location station, which contains one or more geophones. The VIBROSEIS technique, as described in U.S. Pat. No. 3,108,249 and in "Continuous Signal Seismograph", *Geophysics*, Vol. XXV, No. 1 (Feb. 1960), pp. 95–105, by Cawford, Doty and Lee, in simplified terms, identifies the presence of a reflection in the time domain representation of the measured sum by the well-known cross-correlation technique, i.e., solving the equation:

$$1.\ \Phi_{gr}(\tau) = \frac{1}{T} \int_O^T r(\tau) g(t + \tau)\, dt$$

where $g(t-\tau)$ is the input sweep signal delayed by $\tau$, and where $r(t)$ is the measured record. In effect, the input sweep signal is "overlayed" onto the reflection record at incremental delay times ($\tau$); at such delay times as the area under the curve representative of the above product is at a maximum, the delay time equals the travel time of the reflected input sweep signal, i.e., a two-way time is identified. As in single impulse methods, once a reflection time is known, assuming that the wave velocity of the subsurface strata are known, the depth of the associated reflecting subsurface strata interface can be determined.

As is apparent, the practice of the VIBROSEIS technique requires the iterative mathematical process of incrementing the delay time ($\tau$) and, for each such increment, multiplying a sampled representation of the input sweep signal over time by a similarly sampled representation of the measured signal over time and numerically integrating over time the waveform represented by the product of the waveforms. This multiplication and integration must be repeated not only for each delay time increment, but also for each geophone station or other measurement point, in order to generate the complete reflection record prior to normal moveout, stacking, and other well-known data adjustment techniques used in the preparation of the final seismic records for analysis by the geophysicists. This requires not only a large amount of computing power generally not available in the field, but also a large amount of data storage capacity in the field. Furthermore, because of the complexity of the computations required to generate a reflection record, generally only short sweeps, on the order of twelve seconds, are used which requires a sum of sweeps to provide sufficient energy, and an acceptable signal-to-noise ratio, to identify a reflection. In addition, in order for all reflections of the entire sweep to be recorded, a "listening" time after the end of each sweep must be introduced; this listening time can be on the order of five or more seconds.

Building upon the VIBROSEIS technique of using a sweep input vibration, other methods of data acquisition have been developed. One of these methods, namely the "Chichinin" technique, deals with the use of a sweep of a sinusoidal signal with a constantly varying frequency, which in turn generates similar sinusoidal reflections. It was discovered that the product of the input sweep with the measured record results in the sum of two cosine terms, one with a frequency which is the difference between the sweep signal frequency and the reflected signal frequency, and the other with a frequency which is the sum of the two frequencies. It was noted that, for a given two-way time, the difference frequency for each reflection is constant since the sweep signal frequency varies linearly with time. By filtering out the cosine term with the sum frequency and by substituting a frequency variable for the time variable, a frequency domain representation results which is representative of the reflections from the subsurface strata interfaces. It was also discovered that this frequency domain representation could be transformed into the time domain by means of an inverse Fourier transform, thereby creating the time-domain representation of the reflections required for mapping of the subsurface strata interfaces. The Chichinin technique is described in a paper by George Handley entitled "Vibrolokator Method of Interpreting Seismograms from Vibrator Energy Sources," Master's Thesis T-2082, Colorado School of Mines, and is further described below in the detailed description of the invention.

As is evident in comparison with the VIBROSEIS method of correlation, this technique requires only one product of the input waveform by the reflection waveform per station, rather than a series of products and integrals for each of many increments of delay time. The inverse Fourier transform similarly is preformed only once per station. In addition, no "listening" time is required since after the end of the sweep, the product of the two waveforms is zero. However, the Chichinin technique inherently introduces severe phase and amplitude distortion of the reflections. Therefore, another prior implementation of this technique, also described in the above-referenced Handley paper and further described below, uses both a sweep of increasing frequency and a sweep of decreasing frequency, in order to eliminate the phase and amplitude distortion of the reflection record inherent in the Chichinin technique. The use of two sweeps, however, doubles the recording time and expense or, alternatively for the same recording time, cuts in half the signal energy of the data relative to the single-pass technique.

Therefore, it is an object of this invention to provide a method, hereinafter called the "Hand method" or "Hand", by which reflection records of interfaces between subsurface geological formations may be generated with a single unidirectional continuous sweep signal, with minimal phase and amplitude distortion of the reflection record. It is a further object of this invention to provide a method by which the effects of noise are minimized in generating such reflection records.

It is a further object of this invention to provide a method by which such reflection records may be generated with a high degree of resolution in conjunction with relatively low requirements for data storage and compilation.

It is a further object of this invention to provide a method for generating such reflection records in the field.

It is a further object of this invention to provide an apparatus which can automatically perform certain required calculations in the field, thereby minimizing the data storage capacity required in generating such reflection records and allowing storage of more data for higher resolution of such reflection records for the same storage cost.

Other objects and benefits of the invention will become apparent from the detailed description provided herein.

SUMMARY OF THE INVENTION

The invention may be incorporated into a method and apparatus for vibrating the earth in a sinusoidal fashion with the frequency varying linearly with time, sensing the reflected sinusoidal vibrations at a number of surface locations away from the vibration source, mathematically multiplying the time-domain representation of the source vibration by the time-domain representation of the sensed reflections in such a manner as to create two frequency-domain representations of the sensed reflections and performing an inverse Fourier transform on these two combined frequency-domain representations to create a time-domain representation of the reflections of the source vibration from interfaces between subsurface geological strata. The invention may also be incorporated into an apparatus which, in cooperation with well-known seismic data processing equipment, automatically performs the multiplications in the field by receiving electrical signals from the vibration source and from the measuring locations by sequentially performing the multiplication of the source signal by the measured signal from each of the measuring sites, and by outputting the results to conventional seismic data recording and processing equipment.

BRIEF DESCRIPTION OF THE DRAWINGS

FIG. 2 plot b is a representation of the product of the sweep from FIG. 2 plot a with an identical sweep in amplitude and phase, with one reflection delayed one second.

FIG. 2 plot c is a representation of the waveform shown in FIG. 2 plot b after being low pass filtered.

FIG. 3 plot e is a representation of the product of FIG. 3 plot d with an identical (reflected) signal delayed one second.

FIG. 3 plot f is a representation of the waveform shown in FIG. 3 plot e after being low pass filtered.

FIG. 3 plot g is a representation of the waveform shown in FIG. 3 plot f folded along an axis to create an array to be Fourier Transformed.

FIG. 4 plot i is a representation of the real part of the inverse Fourier Transform of FIG. 4 plot h.

FIG. 5 plot k is representation of the product of both signals in FIG. 5 plot j with a reflection at one second.

FIG. 5 plot 1 is a representation of the waveform shown in FIG. 5 plot k after being low pass filtered.

FIG. 6 plot n is a representation of the real and imaginary parts of the Fast Fourier Transform of the frequency domain waveforms given in FIG. 6 plot m.

FIG. 7 plot p is a representation of the sum of the real and Imaginary parts in FIG. 7 plot r.

FIG. 8 plot B is a representation of the first half of the reflection series used for this model (relative times and amplitudes given).

FIG. 8 plot C is a representation of the first half of the reflection series as received by geophones.

FIG. 8 plot D is a representation of the first half of the product of the sweep shown in FIG. 8 plot A and the reflection series shown in FIG. 8 plot C.

FIG. 8 plot E is a representation of the first half of the filtered product of the sweep and the reflection series.

FIG. 8 plot F is an unfiltered representation the first 5 seconds of the positive axis of array to be transformed.

FIG. 8 plot G is a representation (with filtered product) of the placed data, which forms the negative axis of the entire array to be transformed.

FIG. 9 plot B, a continuation of FIG. 8 plot B, is a representation of the second half of the reflection series used for a first model (relative times and amplitudes given). Note that the model contains no reflections in the second half of plot B.

FIG. 9 plot C, a continuation of FIG. 8 plot C, is a representation of the second half of the reflection series as received by geophones.

FIG. 9 plot D, a continuation of FIG. 8 plot D, is a representation of the second half of the product of the sweep shown in FIG. 9 plot A and the reflection series shown in FIG. 9 plot C.

FIG. 9 plot E, a continuation of FIG. 8 plot E, is a representation of the second half of a filtered product.

FIG. 9 plot F, a continuation of FIG. 8 plot F, is a representation of the second 5 seconds of the positive axis of the entire array to be transformed.

FIG. 9 plot G, a continuation of FIG. 8 plot G, is a representation of the positive axis of the entire array to be transformed.

FIG. 10 plot I is a representation of the imaginary part of the inverse Fourier Transform of the array shown in FIGS. 8 and 9 plot G.

FIG. 10 plot J is a representation of the cosine weighting function.

FIG. 10 plot K is a representation of the sine weighting function.

FIG. 10 plot L is a representation of the product of the real part of the inverse Fourier Transform shown in FIG. 10 plot H and the Cosine curve shown in FIG. 10 plot J.

FIG. 10 plot M is a representation of the product of the Imaginary part of the inverse Fourier Transform shown in FIG. 10 plot H and the Sine curve shown in FIG. 10 plot K.

FIG. 10 plot N is the sum of the waveforms shown in FIGS. 10 plot L and plot M.

FIG. 10 plot O is a representation of the reflection series used for a first model (relative times and amplitudes given).

FIG. 11 plot Q is a representation of the first five seconds of the reflection series used for a second model (relative times and amplitudes used.)

FIG. 11 plot R is a representation of the first five seconds of the reflection series as received by geophones.

FIG. 11 plot S is a representation of the first five seconds of the product of the sweep shown in FIG. 11 plot P and the reflection series shown in FIG. 12C.

FIG. 11 plot T is a representation of the first five seconds of the filtered product of the sweep and the reflection series.

FIG. 11 plot U is a representation of the first 5 seconds of the positive axis of array to be transformed.

FIG. 12 plot Q, a continuation of FIG. 11 plot Q, is a representation of the second five seconds of the reflection series used for this model (relative times and amplitudes used). Note that the model contains no reflections in the second half of plot Q.

FIG. 12 plot R, a continuation of FIG. 11 plot R, is a representation of the second five seconds of the reflection series as received by the geophones.

FIG. 12 plot S, a continuation of FIG. 11 plot S, is a representation of the second five seconds of the product of the sweep shown in FIG. 12 plot P and the reflection series shown in FIG. 12 plot P.

FIG. 12 plot T, a continuation of FIG. 11 plot T, is a representation of the second five seconds of the filtered product of the sweep and the reflection series.

FIG. 12 plot U, a continuation of FIG. 11 plot U, is a representation of the second five seconds of the positive axis of the array to be transformed.

FIG. 13 plot W is a representation (with filtered product) of the first half of the positive axis of the entire array to be transformed.

FIG. 14 plot W, a continuation of FIG. 13 plot W, is a representation of the second half of the positive axis of the entire array to be transformed.

FIG. 15 plot Y is a representation of the Imaginary part of the Fourier Transform.

FIG. 15 plot Z is a representation of the cosine weighting function.

FIG. 15 plot A1 is a representation of the sine weighting function.

FIG. 15 plot A1 is a representation of the sine weighting function.

FIG. 15 plot B1 is a representation of the product of the Real part and the cosine curve (FIG. 13 plot W×FIG. 13 plot Y).

FIG. 15 plot C1 is a representation of the product of the Imaginary part and the sine curve (FIG. 13 plot X×FIG. 13 plot Z).

FIG. 15 plot D1 is a representation of the sum of FIGS. 13 plot A1 and 13 plot B1.

FIG. 15 plot E1 is a representation of the reflection series for the second model (relative times and amplitudes given.)

DETAILED DESCRIPTION

Theory of Operation

Figure 1:
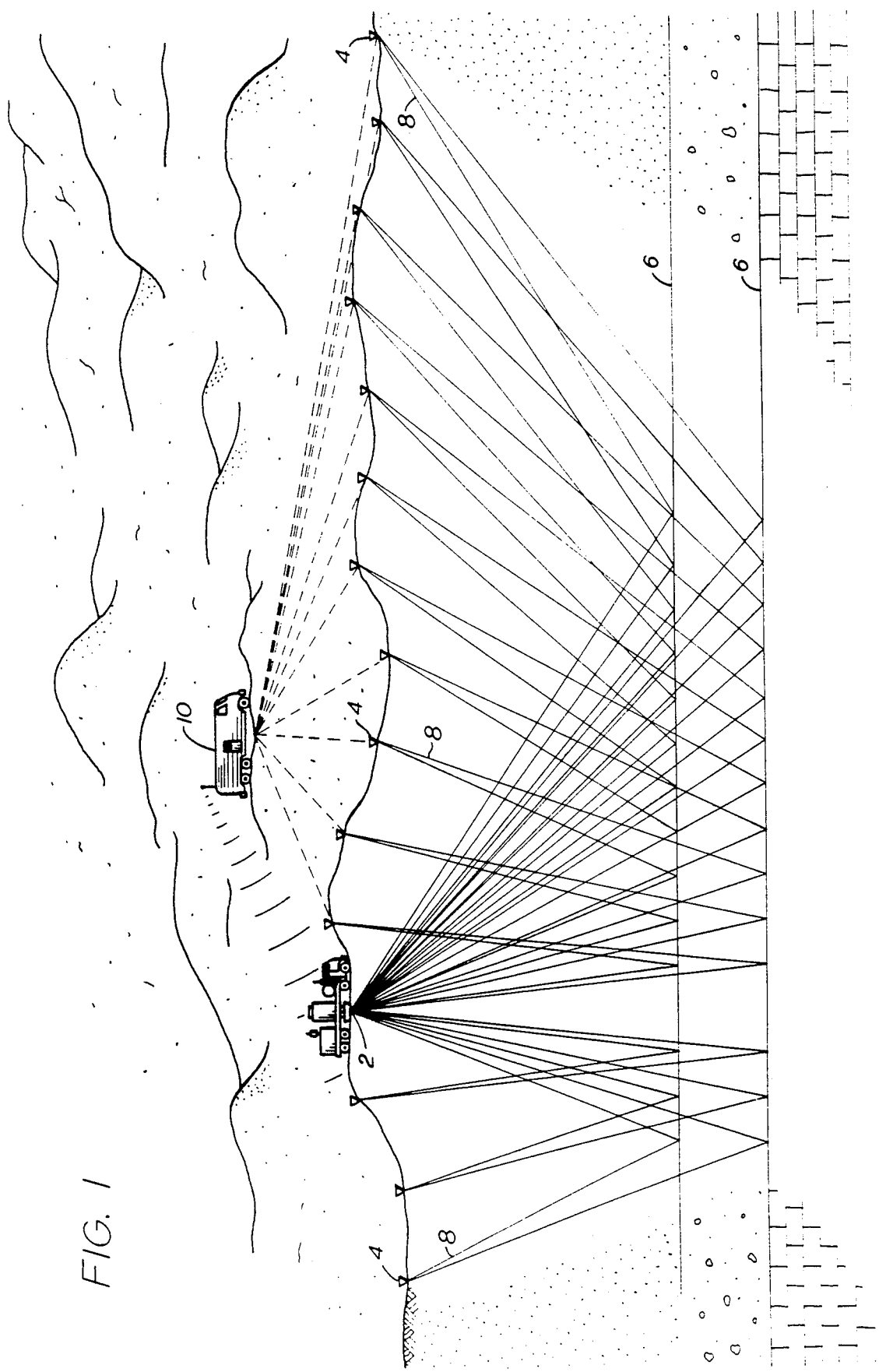
FIG. 1 is a schematic representation of the path 8 of vibrations sourced by a mechanical vibrator 2 and reflected from interfaces 6 between subsurface geologic formations up to geophones 4 on the surface that detect these reflections as analog signals and send them to a recorder 10.

As noted above, this invention relates to the recording of seismic data from a continuous source vibrator. FIG. 1 is a simplified representation of the application of seismic prospecting equipment at a theoretical location on the surface of the earth. Vibrator 2 is designed so that it vibrates the earth in sinusoidal fashion, with the frequency of the sinusoidal waves varying linearly with time. Vibrator 2 is an apparatus as is well known in the art, which is capable of providing the typical sweep signal in the industry of 20 Hz to 120 Hz over a time period of 12 seconds. As will be discussed below, the present invention may employ sweep signals over a time period as long as 40 seconds. Also placed along the surface, as shown in FIG. 1, are. geophones 4. The geophones 4 are able to receive reflections of the seismic waves from vibrator 2 from interfaces 6 between subsurface geological strata. Geophones 4 are devices also as well known in the art. Therefore, vibrator 2 and geophones 4 provide the data necessary for the implementation of prior techniques and also of this invention, and to determine the depth of interfaces 6 between subsurface geological strata.

Figure 2:
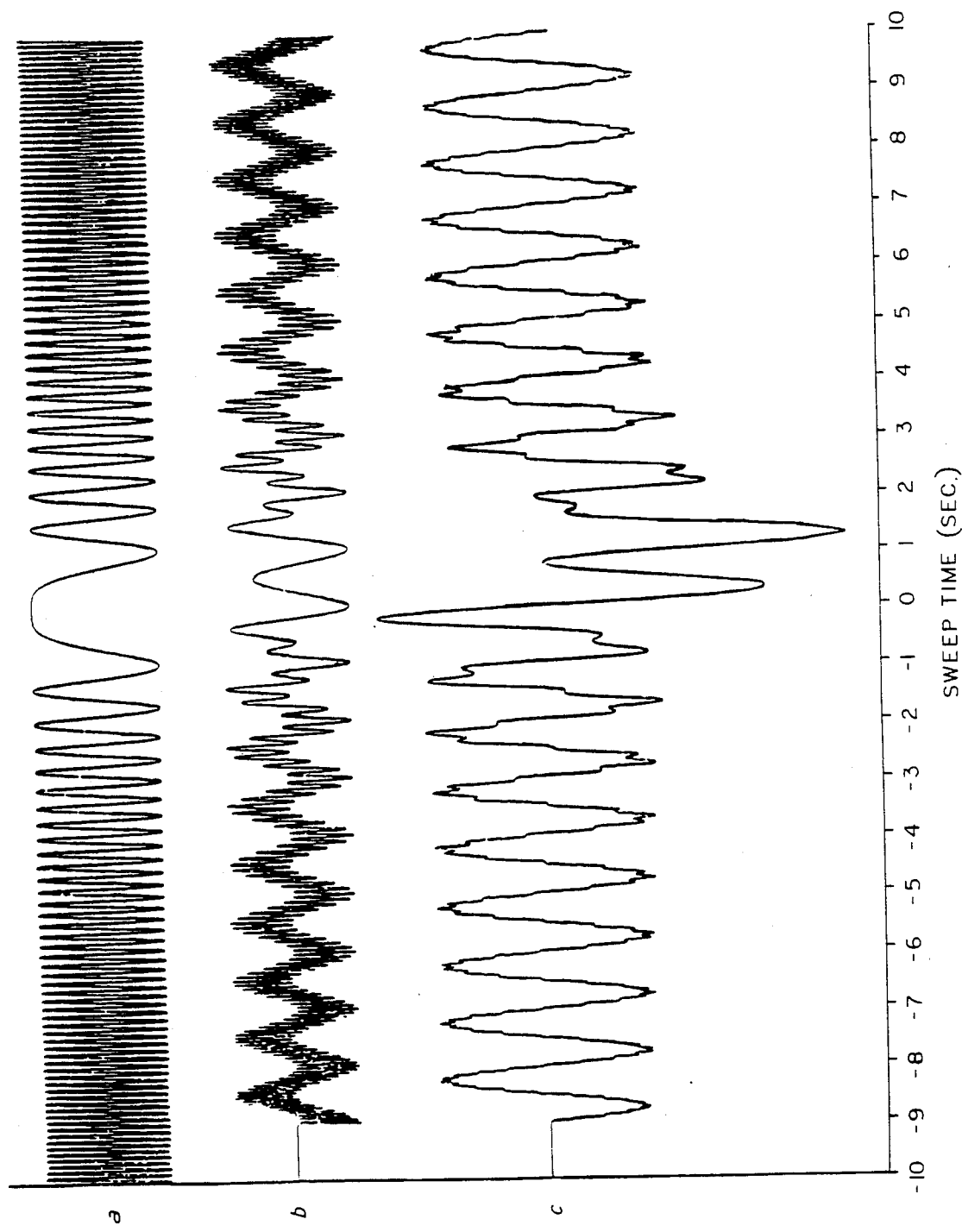
FIG. 2 plot a is a representation of a 20 second sweep from 10 Hz to zero and then back to 10 Hz.

FIG. 2 plot a shows the input sweep waveform of a sinusoid having a frequency which varies linearly over time. Such a sweep can be sourced by vibrator 2. The waveform of plot a is a sinusoidal waveform with a frequency decreasing linearly with time for t<0, and with a frequency increasing linearly with time for t>0. It should be noted that the waveform in plot a actually exists only in theory as the vibrators would decouple from the earth at frequencies close to zero. The reference point of t=0 is placed at the point in time between said downsweep and said upsweep for convenience of the mathematical derivations. This waveform may be represented as a function a(t) as follows:

2. $a(t) = A \cos \alpha t^2$

Alpha ($\alpha$), the time rate of change of frequency, is defined as follows:

3. $\alpha = \dfrac{2\pi (f_h - f_l)}{2T} = \dfrac{\pi df_s}{dt}$ where $f_h$=the upper sweep frequency limit, $f_l$=the lower sweep frequency limit, $f_s$=sweep or source vibration frequency, t=time, and T=sweep time. For the waveform of plot a, $\alpha = (\pi)1$ Hz/Sec.

A reflection of the waveform from interface 6 of subsurface strata, as shown in FIG. 1, would result in a waveform similar to that represented in FIG. 2 plot a, but with the time axis shifted by the two-way time of the reflection. For a given reflection r, where the two-way time is represented as $t_r$, the reflected waveform would be a function b(t) of the following form:

4. $b(t) = Ah_r \cos \alpha(t - t_r)^2$ where $h_r$ is the reflection coefficient representing the amplitude attenuation for reflection r. Note that where more than one reflection is present, b(t) would consist of the sum of the series of such cosine terms from r=1 to n, with n being the number of reflections.

If the input sinusoidal a(t) were multiplied by the measured reflection b(t), the product would be a time function represented as f(t), as follows:

5. $f(t) = A \cos \alpha t^2 \times Ah_r \cos \alpha(t - t_r)^2$

But since

6. $\cos A \times \cos B = \frac{1}{2}[\cos(A+B) + \cos(A-B)]$ then

7. $f(t) = \dfrac{A^2 h_r}{2} [\cos \alpha(t^2 + (t - t_r)^2) + \cos \alpha(t^2 - (t - t_r)^2)]$ $= \dfrac{A^2 h_r}{2} [\cos \alpha(2t^2 - 2t t_r + t_r^2) + \cos \alpha(2t_r t - t_r^2)]$ The resulting product term includes two cosine terms: a summation frequency cosine term, $\cos \alpha(2t^2 - 2t_r t + t_r^2)$, and a difference frequency cosine term, $\cos \alpha(2t_r t - t_r^2)$. FIG. 2 plot b shows the product of the waveform of plot a times a one second reflection, assuming no significant amplitude attenuation; it should be apparent from plot b that this product indeed appears as a low constant frequency cosine wave (i.e., the difference frequency cosine term) upon which a higher variable frequency cosine wave (i.e., the sum frequency cosine term) is superimposed.

It is well-established that for a function of the form,

8. $f(t) = A \cos(\Theta(t))$, the rate of change of the time-dependent phase gives a time-dependent instantaneous angular frequency, $w_i$:

9. $w_i = \dfrac{d\Theta(t)}{dt}$

Because $\alpha$ is a constant over time, for a given delay time $t_r$, the difference frequency cosine term in equation 7, $\cos \alpha(2t_r t - t_r^2)$, has an instantaneous angular frequency, $w_i$:

$$10.\ w_i = \frac{d}{dt}(a(2t_r t - t_r^2)) = 2\alpha t_r$$

The instantaneous frequency, $f_i$, is equal to $w_i/2\pi$. Thus, using equations 3 and 10, the product of the waveform of plot a with a reflection delayed by a one second two way time has an instantaneous frequency:

$$11.\ f_i = \frac{2\alpha t_r}{2\pi} = \frac{(2)(2\pi)(f_h - f_l)(t_r)}{(2\pi)(2T)} = \frac{(f_h - f_l)(t_r)}{T}$$

The difference frequency cosine term will have an instantaneous frequency, $f_i$, of 1 Hz since $\alpha = (\pi)1$ Hz/sec and the two way time is one second. As shown by equation 11 above, the product of the two-way-time, $t_r$, with the time rate of change of the frequency of the input sweep waveform divided by $\pi$ determines the instantaneous frequency of the difference frequency cosine term. Conversely, by knowing the instantaneous frequency of the difference frequency cosine term, since the time rate of change of the input sweep waveform divided by $\pi$, $(f_h - f_l)/T$, is known, the two-way time can be determined.

Looking to the difference frequency cosine term only, it is a particular function of time t, which will have a Fourier transform with delta functions at $\pm t_r$. Since the sum frequency cosine term will have an instantaneous angular frequency of $4\alpha t - 2\alpha t_r$, no contribution from the sum frequency cosine term to the spectrum of the Fourier transform of the difference frequency cosine term will result if $|t| >> t_r$, since then the instantaneous angular frequency of the sum frequency cosine term, $4\alpha t - 2\alpha t_r$, will be significantly higher than the instantaneous angular frequency of the difference frequency cosine term, $2\alpha t_r$. Therefore, since the sum frequency cosine term is neither necessary nor useful in determining the reflection time, it can be filtered by a low-pass filter, if desired, with the result as graphically shown in FIG. 2 plot c. The low-pass filter may be done by a number of well-known techniques, including the mathematical convolution of digital representations of the waveform of plot b by a digital low-pass filter function. While the filtering is not essential since the sum frequency cosine term will either transform out of the range of interest on the time domain reflection record or be "aliased" and contribute noise to the reflection record, for purposes of explaining the theory of operation of the invention, such low-pass filtering will be performed and assumed to add insignificant phase shift and insignificant amplitude attenuation. The filtered product function, where the sum frequency cosine term is filtered out, can be represented by f'(t) as follows:

$$12.\ f'(t) = \frac{A^2 h_r}{2}[\cos(2\alpha t t_r - \alpha t_r^2)]$$

This representation can easily be converted into a function of frequency, and thereby into the frequency domain, by substituting a frequency variable q, where $q = 2\alpha t$, and a phase angle $\Phi_r$, where $\Phi_r = \alpha t_r^2$, as follows:

$$13.\ f'(q) = \frac{A^2 h_r}{2}\cos(qt_r - \Phi_r)$$

Although this derivation employs the use of $q = 2\alpha t$, which is similar to the instantaneous frequency, it is possible to use other frequency-related variables as well. For example, instantaneous frequency, which differs from instantaneous angular frequency by the constant factor of $2\pi$, could also be used to obtain a frequency domain representation of the product function.

In the ideal case, if the sweep signal consisted of a sweep signal from an infinite frequency down to zero frequency and back up to an infinite frequency, the inverse Fourier transform F(T) of the frequency domain representation of f'(q) would be:

$$14.\ F(T) = \frac{1}{2\pi}\int_{-\infty}^{\infty} \frac{A^2 h_r}{2}[\cos(qt_r - \Phi_r)]e^{iqt}dq$$
$$= \frac{k}{2}[\delta(T - t_r) + \delta(T + t_r)\cos\Phi_r]$$
$$+ \frac{ik}{2}[\delta(T - t_r) + \delta(T + t_r)\sin\Phi_r]$$

This, of course, places delta functions at $T = \pm t_r$, for both the real and imaginary parts of the Fourier transform, making the identification of the two-way time $t_r$ for a given reflection r quite easy. However, in real applications, the sweep must of course be limited to finite frequencies and must also be limited for reasons of cost of data acquisition and manipulation, because as the sweep signal is shortened, the cost of such exploration is reduced.

Figure 3:
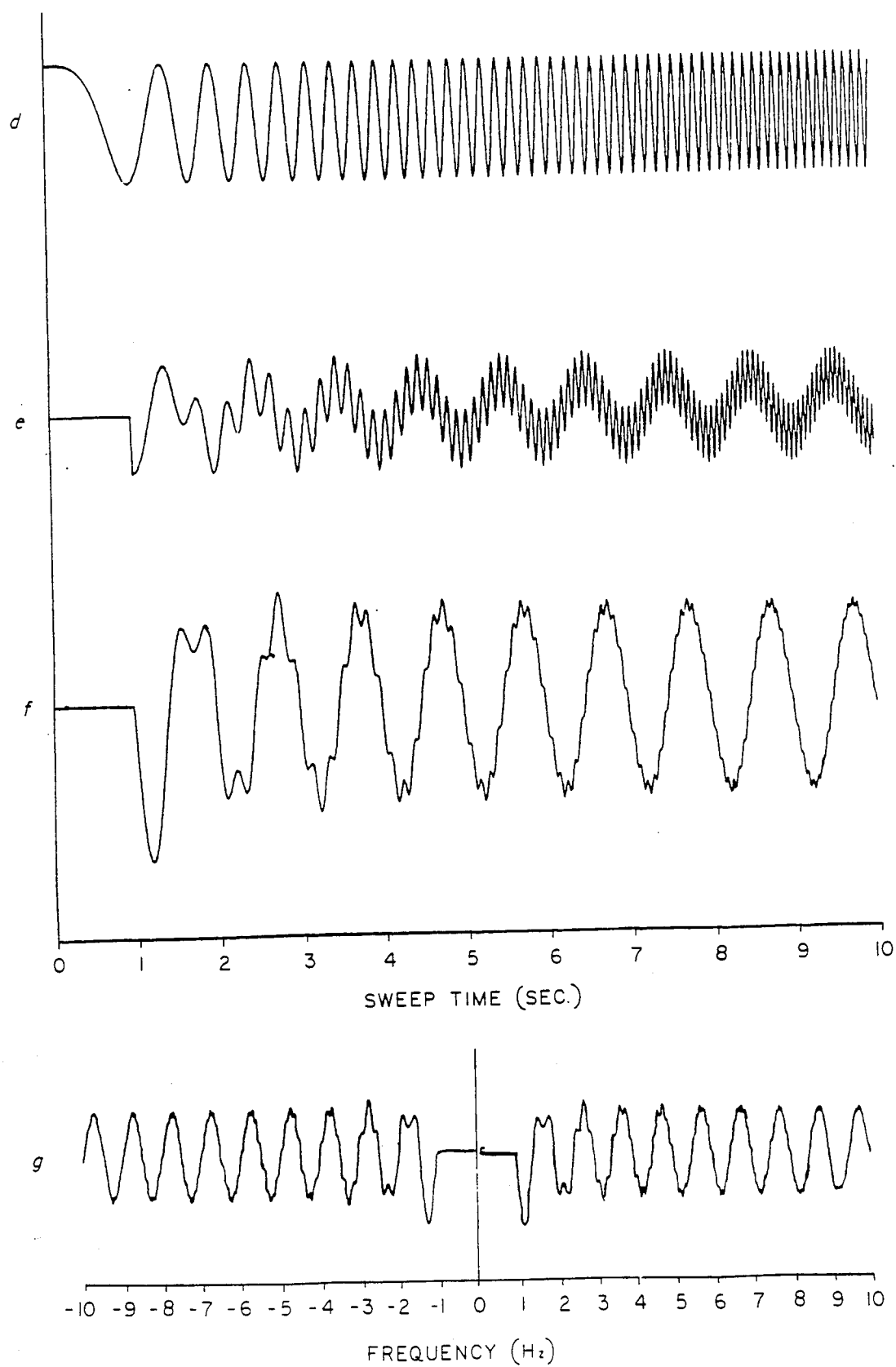
FIG. 3 plot d is a representation of a 10 second sweep from Zero to 10 Hz.

A first prior technique, namely the Chichinin technique, utilized a unidirectional sweep signal, i.e., an increasing frequency sweep signal only, as the input vibration of vibrator 2. The waveform of such a signal is represented in FIG. 3 plot d. The product of the "up" sweep. and its reflection is still represented by the time-domain function f(t) as represented in equation 7, except that the time t is limited to positive time only, and to a certain bandwidth, as shown in FIG. 3 plot e. By filtering out the sum frequency cosine term as described above, and by performing the same conversion of f'(t) to a frequency domain function f'(q), as described above, this technique results in a waveform represented by the following:

$$15.\ f'(q) = \frac{A^2 h_r}{2}\cos(qt_r - \Phi_r)$$

for $q > 0$.

In order to perform the inverse Fourier transform of this frequency function, and so that such a transform would have a cognizable real part, the frequency domain function f(q) is transformed into the sum of an even function and an odd function. An even function which equals f'(q) for $t > 0$ is as follows:

$$16.\ f''(q) = \frac{A^2 h_r}{2}\cos(qt_r \operatorname{sgn} t - \Phi_r)$$
$$= \frac{A^2 h_r}{2}\cos(qt_r - \Phi_r \operatorname{sgn} q)$$

The inverse Fourier transform of this even function will result in a real function only, as is well known. This even function of frequency in effect "folds" the product waveform of FIG. 3C onto the negative time axis; in addition, since the sweep is necessarily truncated at a certain frequency, the even frequency function of the product is similarly truncated. The truncated folded waveform representative of the even-symmetric frequency function f''(q) from equation 16 is shown in FIG. 3 plot g. However, it should be apparent that the phase of the folded waveform in the $t<0$ halfplane is shifted from that in the $t>0$ half-plane. As will be discussed below, this adversely affects the output from the inverse Fourier transform process, making this first prior technique impracticable.

Figure 4:
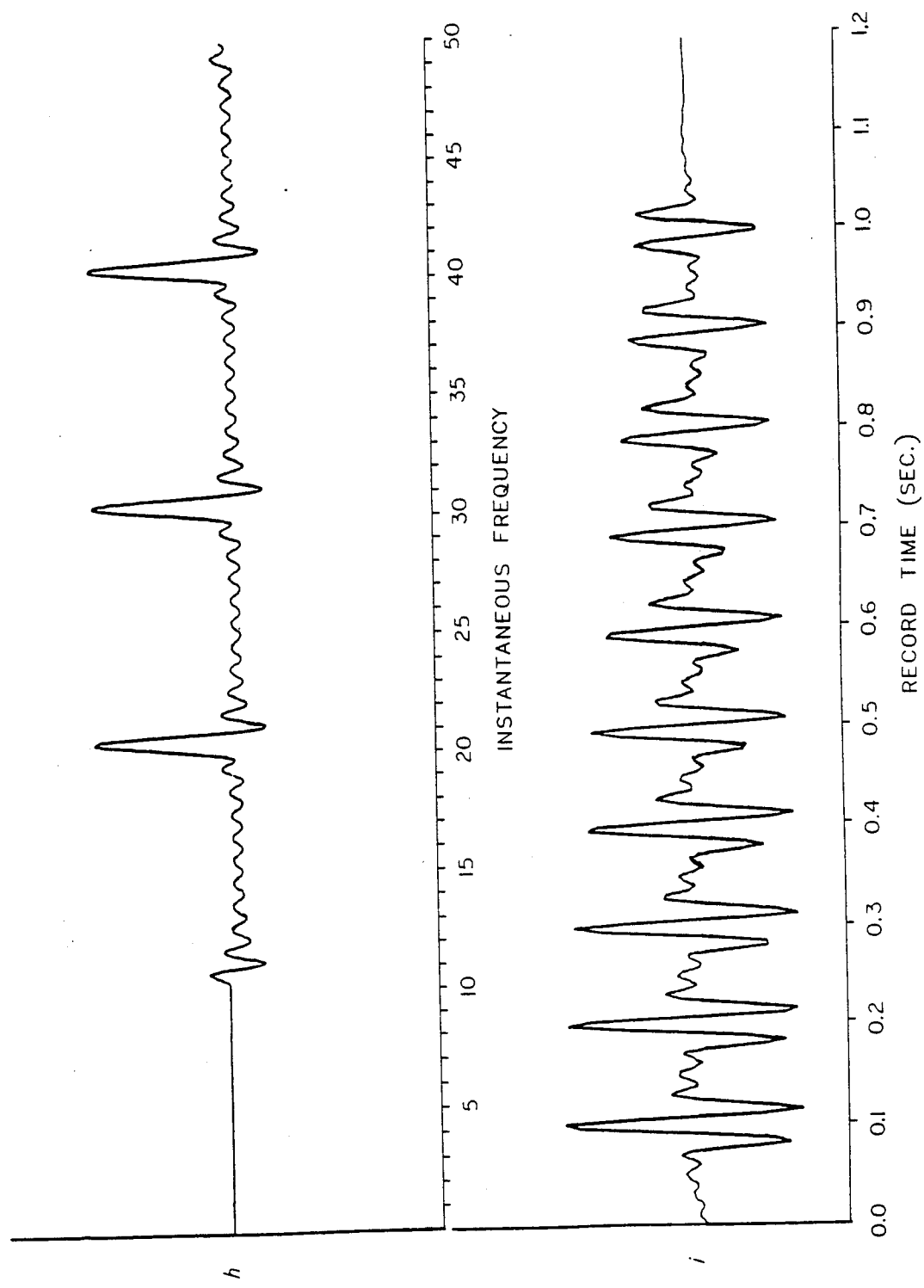
FIG. 4 plot h is a representation of a low pass filtered product of a 10 to 50 Hz, 60 second sweep with 10 reflections at 0.1 second intervals.
Figure 5:
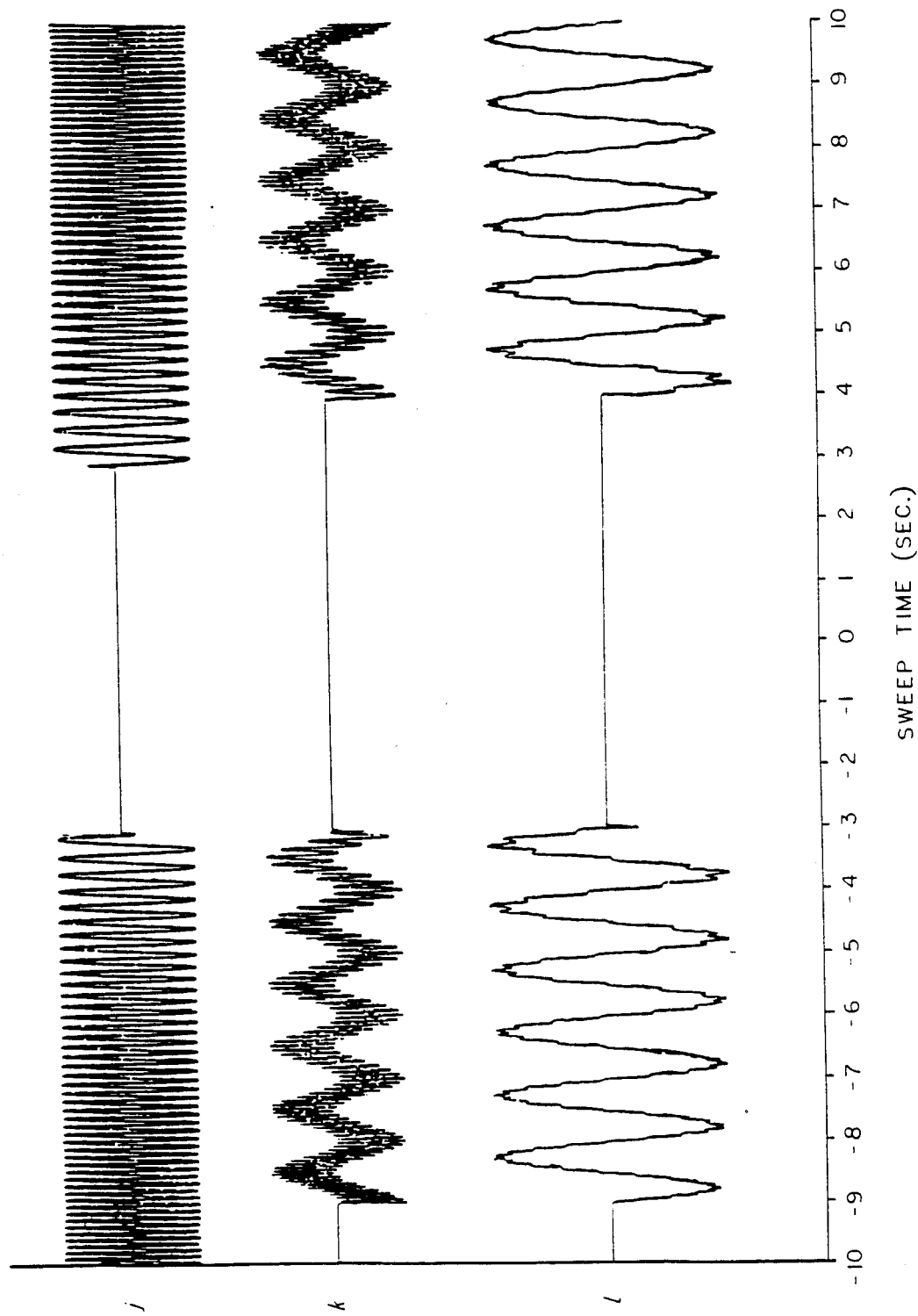
FIG. 5 plot j is a representation of a 10 to 3 Hz, 7 second down sweep (on the left hand side of the Figure) with a 3 to 10 Hz, 7 second up sweep (on the right hand side of the Figure) loaded into a time axis that can also be considered a frequency axis.

For this first prior technique, looking at the waveform prior to its truncation, since $2\alpha t_r$ is a constant for each reflection r, the inverse Fourier transform would be expected to result in delta functions at $T=\pm t_r$. However, the truncation of the sweep into a sweep of a minimum and maximum frequency will, as is well known, result in a zero phase wavelet subject to Gibb phenomenon surrounding $T=\pm t_r$. Furthermore, since the folded data is not phase-consistent with the data in the $t>0$ half-plane, by well-known mathematical derivations it can easily be determined that the inverse Fourier transform of f''(q), limited to the input bandwidth of frequencies, will result in a waveform consisting of the sum of a zero phase wavelet centered at $T=\pm t_r$ multiplied by the cosine of $\Phi_r$ plus the Hilbert transform of the zero phase wavelet multiplied by the sine of $\Phi_r$. This inverse Fourier transform results in a time-domain function as represented in FIG. 4 plot i for a series of reflections at two-way times $t_r$. As is evident from FIG. 4 plot i, the longer the two-way time $t_r$, the less well-defined is the wavelet surrounding the two-way time $t_r$, as each reflection varies in amplitude and phase from a symmetric positive zero phase wavelet with a positive peak, through a positive Hilbert transform of a zero phase wavelet, to a symmetric negative zero phase wavelet as two-way time $t_r$ increases. The shifting of the shape of the wavelets with increasing $t_r$ is a direct result of the phase inconsistency between the $q>0$ and the $q<0$ half-planes, resulting from the Hilbert transform terms in the inverse Fourier transform operation. A second prior technique addressed the above-described problem of phase inconsistency by performing both a downsweep and an upsweep input vibration. The waveform generated by this upsweep and downsweep is as shown in FIG. 5 plot j. As described above, the product of this input waveform times a reflection r with two-way time $t_r$ will result in the sum of a difference frequency cosine term plus a sum frequency cosine term; the sum frequency cosine term can be filtered by a low-pass filter, if desired, resulting in a waveform as shown in FIG. 5 plot 1, and represented by the following time function f'(t):

$$17.\ f'(t) = \frac{A^2 h_r}{2} w(t) \cos(2\alpha t t_r - \alpha t_r^2)$$

where w(t) represents a window function describing the bounds of the input sweep function to finite time and frequency. It is evident that the waveform shown in FIG. 5 plot 1 is phase consistent from the $t<0$ half-plane into the $t>0$ half-plane. Again replacing $2\alpha t$ with q, and $\alpha t_r^2$ with $\Phi_r$, the filtered frequency domain product function f'(q) can be realized:

$$18.\ f'(q) = \frac{A^2 h_r}{2} w(q) \cos(q t_r - \Phi_r)$$

Where w(q) represents a window function in terms of frequency.

The inverse Fourier transform F(T) of the frequency domain function f'(q) can be computed from the Fourier integral:

$$19.\ F(T) = \frac{1}{2\pi} \int_{-\infty}^{\infty} \frac{A^2 h_r}{2} w(q) \cos(q t_r - \Phi_r) e^{iqt} dq$$

It is easier to use the convolution technique to separate the inverse Fourier transform of the cosine term from that of the window function; the inverse Fourier transform C(T) of the cosine term above can be computed, using Euler's identity, to result in:

$$20.\ C(T) = \frac{1}{2}[\delta(T - t_r) + \delta(T + t_r)]\cos \Phi_r +$$

$$\frac{i}{2}[\delta(T - t_r) + \delta(T + t_r)]\sin \Phi_r$$

This inverse Fourier transform thus will have a real and imaginary delta function at $T=\pm t_r$ for each reflection r, weighted by the cosine and sine of $\Phi_r$, respectively. The inverse Fourier transform of the window function w(q) is a zero phase wavelet, as is well known in the art.

Figure 6:
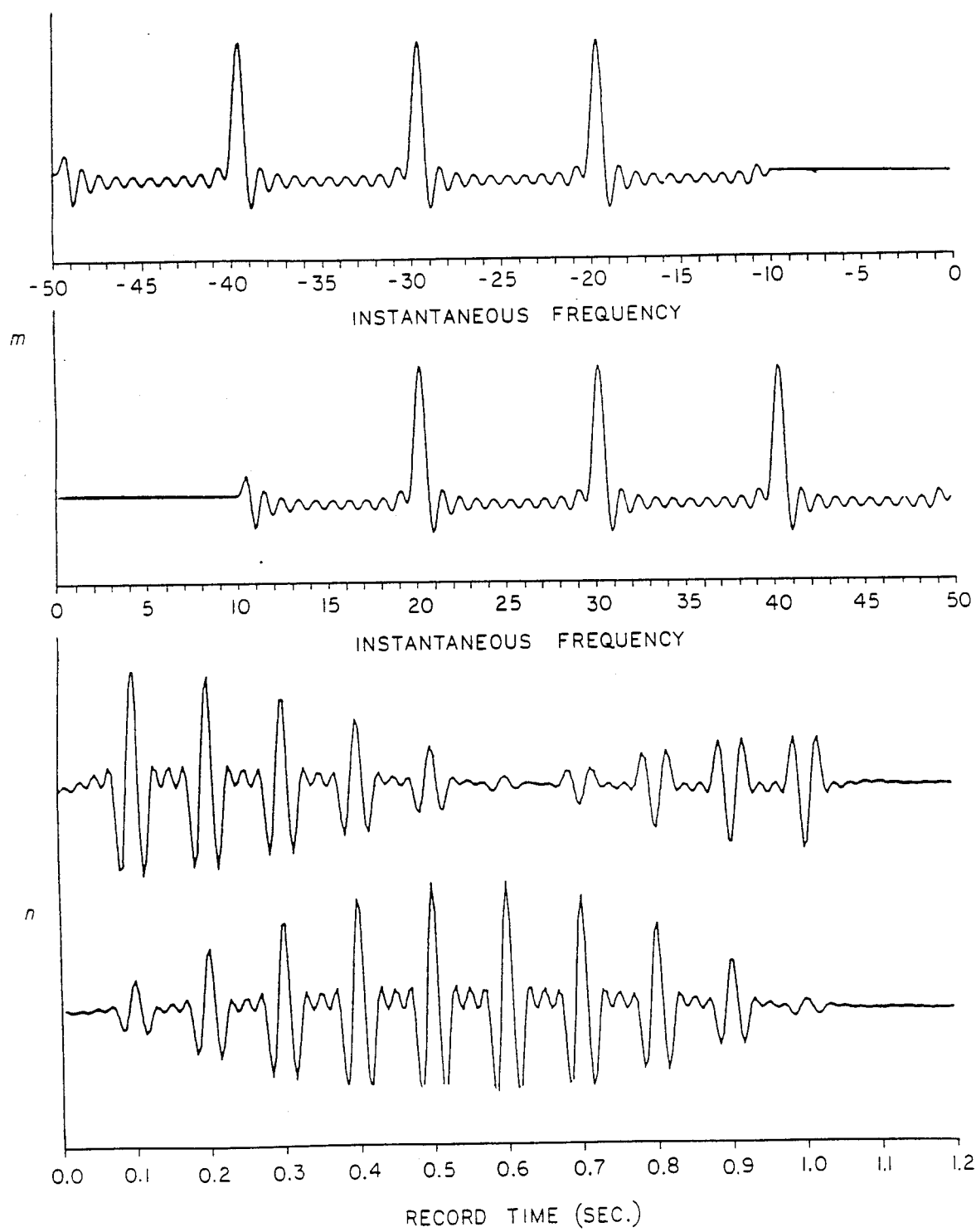
FIG. 6 plot m is a representation of the filtered products of a 50 to 10 Hz, 60 second down sweep and a 10 to 50 Hz, 60 second up sweep, both with 10 reflections at 0.1 second intervals.

The convolution of zero phase wavelets or W(t) with C(T), multiplied by the appropriate coefficients, will result in a function which will have, for each reflection r, a real part at $T=t_r$ weighted by the reflection coefficient $h_r$ and the cosine of $\Phi_r$, and an imaginary part also at $T=t_r$ weighted by the reflection coefficient $h_r$ and the sine of $\Phi_r$. These wavelets are shown for a series of reflections r, from r=0.1 to 1.0, at incremental two-way times $t_r$, in FIG. 6 plot n.

In order to correctly identify the amplitudes and the two-way times $t_r$ of a series of reflections r, this second prior technique developed the method of combining the real and imaginary parts of the results of the convolution of the inverse Fourier transforms. At $T=t_r$, the function F(T), after convolution, can be represented as:

$$21.\ F(T) = \frac{A^2 h_r}{4}[W(T - t_r) \cos \Phi_r + i\ W(T - t_r) \sin \Phi_r]$$

It is now useful to relieve the real and imaginary parts of F(T) of their respective cosine $\Phi_r$ and sin $\Phi_r$ weighting functions. Since $\Phi_r$ is equal to $\alpha t_r^2$, at each two-way time $T=t_r$ the cosine and sine of $\alpha T^2$ are equal to the cosine and sine of $\alpha t_r^2$, respectively. Accordingly, two new functions can be created as follows:

$$22.\ F_{Re}(T) = \frac{A^2 h_r}{4}[W(T - t_r) \cos \alpha t_r^2 \cos \alpha T^2]$$

$$F_{Im}(T) = \frac{A^2 h_r}{4}[W(T - t_r) \sin \alpha t_r^2 \sin \alpha T^2]$$

Evaluating these new functions at $T=t_r$ gives the following results:

$$23.\ F_{Re}(T = t_r) = \frac{A^2 h_r}{4}[W(T - t_r) \cos^2 \alpha T^2]$$

and

24. $F_{Im}(T = t_r) = \frac{A^2 h_r}{4} [W(T - t_r) \sin^2 \alpha T^2]$

Figure 7:
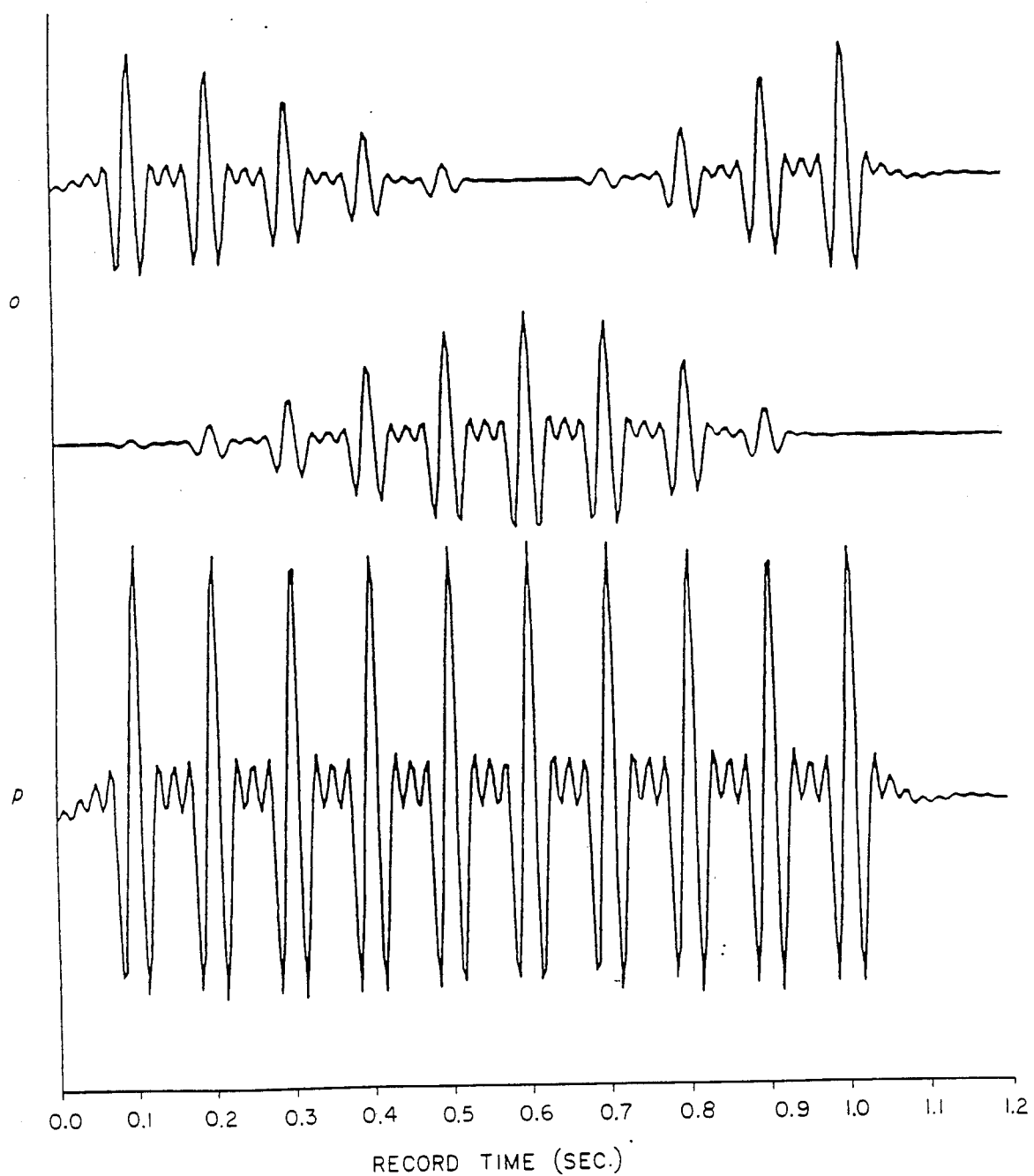
FIG. 7 plot o is a representation of two waveforms: (1) the upper waveform, which is a real part of the Fast Fourier Transform shown in FIG. 6 plot n multiplied by the Cosine weighting function, and (2) the lower waveform, which is a representation of the Imaginary part of FIG. 6 plot n multiplied by the Sine weighting function.

These new functions are shown in FIG. 7 plot o. Summing these two new functions, evaluated at the two-way times $T = t_r$ creates a real function as follows:

25. $F(T = t_r) = F_{Re}(T = t_r) + F_{Im}(t = t_r) =$ $\frac{A^2 h_r}{4} [W(T - t_r) \cos^2 T^2] + \frac{A^2 h_r}{4} [W(T - t_r) \sin^2 T^2] =$ $\frac{A^2 h_r}{4} [W(T - t_r) (\cos^2 T^2 + \sin^2 T^2)] = \frac{A^2 h_r}{4} [W(T - t_r)]$ This function is a zero phase wavelet for each reflection r, centered at its two-way time $t_r$, with an amplitude proportional to the reflection coefficient $h_r$ for each reflection. The entire reflection record is the sum of the series of reflections. The waveform represented by this series, for a series of reflections r, is shown in FIG. 7 plot p In comparison to the result of the Chichinin technique as shown in FIG. 4 plot i, it is evident from FIG. 7 plot p that the wavelets are of relatively constant waveform shape, due to minimal phase and amplitude distortion.

The invention is directed to a method by which only a single sweep, either an upsweep or a downsweep, is sourced by vibrator 2 as sourced for the Chichinin technique, but which also avoids the pulse shape degradation resulting from the phase and amplitude distortion inherent in the Chichinin technique. The invention is premised on a theory of an infinite sweep that is truncated such that a window of data between an initial and final sweep frequency is generated. This window of data—consisting of the product of the amplitude of the source vibrations and the sensed reflections—is stored. Using this window of data, a second representation of the single sweep product function as a function of frequency is calculated as if the source vibration frequency were linearly changing from the negative of one frequency limit to the negative of the second frequency limit, such that when combined with the actual stored window of data, phase consistency is maintained. By way of example, if the single sweep was an upsweep, then the second representation is calculated as if the source vibration frequency were decreasing from the negative of the second, higher, frequency limit to the negative of the first frequency limit. In graphical terms, the recorded window of data is "placed" on the other side of the half-plane of the frequency axis to create a second window such that phase consistency is maintained. Similarly, if the representation of the single sweep is calculated or placed prior to substitution of the frequency variable, then the second representation of the single sweep product function as a function of time is calculated as if the values of time were changing from the negative of the value of time associated with one source vibration frequency limit to the value of time associated with the second source vibration frequency limit. Referring again to FIG. 5 plot 1, representing the filtered product of the input up and downsweeps with a reflection as used in the second prior technique, the waveform in the $t < 0$ half-plane is phase consistent with the waveform in the $t > 0$ half-plane, i.e., there is no phase shift in the difference frequency cosine term as it crosses the $t = 0$ axis. Using the Hand method, however, the phase consistency can be maintained with a single sweep.

As noted in discussion of equations 12 and 13, the filtered product function, f'(t), can be easily converted into a frequency domain by substituting a frequency variable q and phase angle $\phi_r$. The instantaneous frequency of the difference frequency cosine term is a constant because, as discussed above, the frequency of the input sweep signal varies linearly with time, making the difference in frequency between the input sweep signal and its reflection at a two-way time $t_r$ a constant. Using these principles, it has been found that, for a given window of data of the filtered product function f'(q) as derived in equation 13, in the $q < 0$ half plane, the filtered product function placed in a window of data in the $q > 0$ half-plane is identical, provided that any frequency within the window is sufficiently greater than zero. It should be noted that the relationship of the filtered product in one of the windows to the filtered product in the other window in the other half-plane is not of complete symmetry about the $q = 0$ axis, but instead is based upon a calculation of a second representation of the window of data such that the second representation is phase consistent with the recorded window of data. Thus, if a recorded window of data in the $q < 0$ half-plane extends from $-q_2$ to $-q_1$, where $|q_1| >> 0$, then the filtered product function placed into the $q > 0$ half-plane is identical from $q_1$ to $q_2$, such that 26. $f'(q_1) = f'(-q_2)$, and 27. $f(q_2) = f'(-q_1)$ Thus, the values stored sequentially from $-q_2$ to $-q_1$, are stored sequentially in the $q > 0$ half-plane from $q_1$ to $q_2$. To calculate the second representation, the product values of the first representation are sequentially associated with positive values of source vibration frequency in the opposite half-plane to create a visually identical representation. These positive values of source vibration frequency sequentially associated with the product values of the first representation are selected so that, rather than decreasing from the time associated with the first, higher frequency limit to the time associated with the second, lower frequency limit as occurred in the first representation, the positive values of source vibration frequency sequentially increase from the negative of the value of frequency associated with the second, lower frequency limit to the negative of the value of frequency associated with the first, higher frequency limit. Consequently, in calculating the second representation, the product values of the first representation are sequentially associated with values of frequency in the opposite half-plane such that the second representation, when visually compared to the first representation, appears to be merely the result of placing the first representation in the opposite half plane between the negative of the value of frequency associated with the first frequency limit and the negative of the value of frequency associated with the second, lower frequency limit. Similarly, if a recorded window of data in the $q > 0$ half-plane extends from $q_1$ to $q_2$, where $|q_1| >> 0$, then the filtered product function placed into the $q < 0$ half-plane is identical from $-q_1$ to $-q_2$, such that 28. $f'(-q_1) = f'(q_2)$ and 29. $f'(-q_2) = f'(q_1)$ Thus, the values stored sequentially from q to $q_2$ are stored sequentially in the $q<0$ half-plane, from $-q_2$ to $-q_1$. Thus, to calculate the second representation, the product values of the first representation are sequentially associated with negative values of source vibration frequency in a symmetrically located window in the opposite half-plane to create a visually identical representation. These negative values of source vibration frequency that we sequentially associated with the product values of the first representation are selected so that, rather than increasing from the first frequency limit to the second, higher frequency limit as occurred in the first representation, the negative values of source vibration frequency sequentially decrease from the negative of the value of frequency associated with the second, higher frequency limit to the negative of the value of frequency associated with the first, lower frequency limit. Consequently, in calculating the second representation, the product values of the first representation are sequentially associated with values of frequency in the opposite half-plane such that the second representation, when visually compared to the first representation, appears to be merely the result of placing the first representation in the opposite half plane between the negative of the value of frequency associated with the first frequency limit and the negative of the value of frequency associated with the second, higher frequency limit. Regardless of whether an upsweep or downsweep is performed, in addition to the calculation of the second representation in the opposite symmetric window across the $q=0$ axis, it is necessary to further define $f'(q)$ such that $f'(q)=0$ where $|q_1| > |q| > |q_2|$. As an alternative to the placing of the data in the frequency domain, one can instead place the data prior to the substitution of the frequency variable q and phase angle $\Phi_r$. Assuming an infinite sweep has been truncated in conformity with the actual sweep performed, it is necessary to first identify the value of time theoretically associated with a particular source vibration frequency by using the $\alpha$ and the values of the source vibration frequencies. In other words, to properly locate the actual sweep data in a theoretical infinite sweep, the amplitude of the representation at sweep time=0 must be transposed to its proper location on the infinite sweep. Thus it has been found that, for a given window of the filtered product function f'(t) as derived in equation 12, in the $t<0$ half-plane, the filtered product function placed in a window of data in the $t>0$ half-plane is identical, provided that any t within a window is sufficiently greater than zero. It should be noted that the relationship of the filtered product function in one of the windows to the filtered product function in the window in the other half-plane is not one of complete symmetry about the $t=0$ axis, but instead is based upon a calculation of a second representation of the window of data such that the second representation is phase consistent with the recorded window of data. For example, referring to FIG. 5 plot 1, if a recorded window of data in the $t<0$ half-plane extends from $-t_2$ to $-t_1$, where $|t_1|>>0$, the filtered product function placed into in the $t>0$ half-plane is identical from $t_1$ to $t_2$, such that 30. $f'(t_1)=f'(-t_2)$ and 31. $f'(t_2)=f'(-t_1)$ Thus, the values stored sequentially from $-t_2$ to $-t_1$ are stored in sequentially in the $t>0$ half-plane from $t_1$ to $t_2$.

Figure 8:
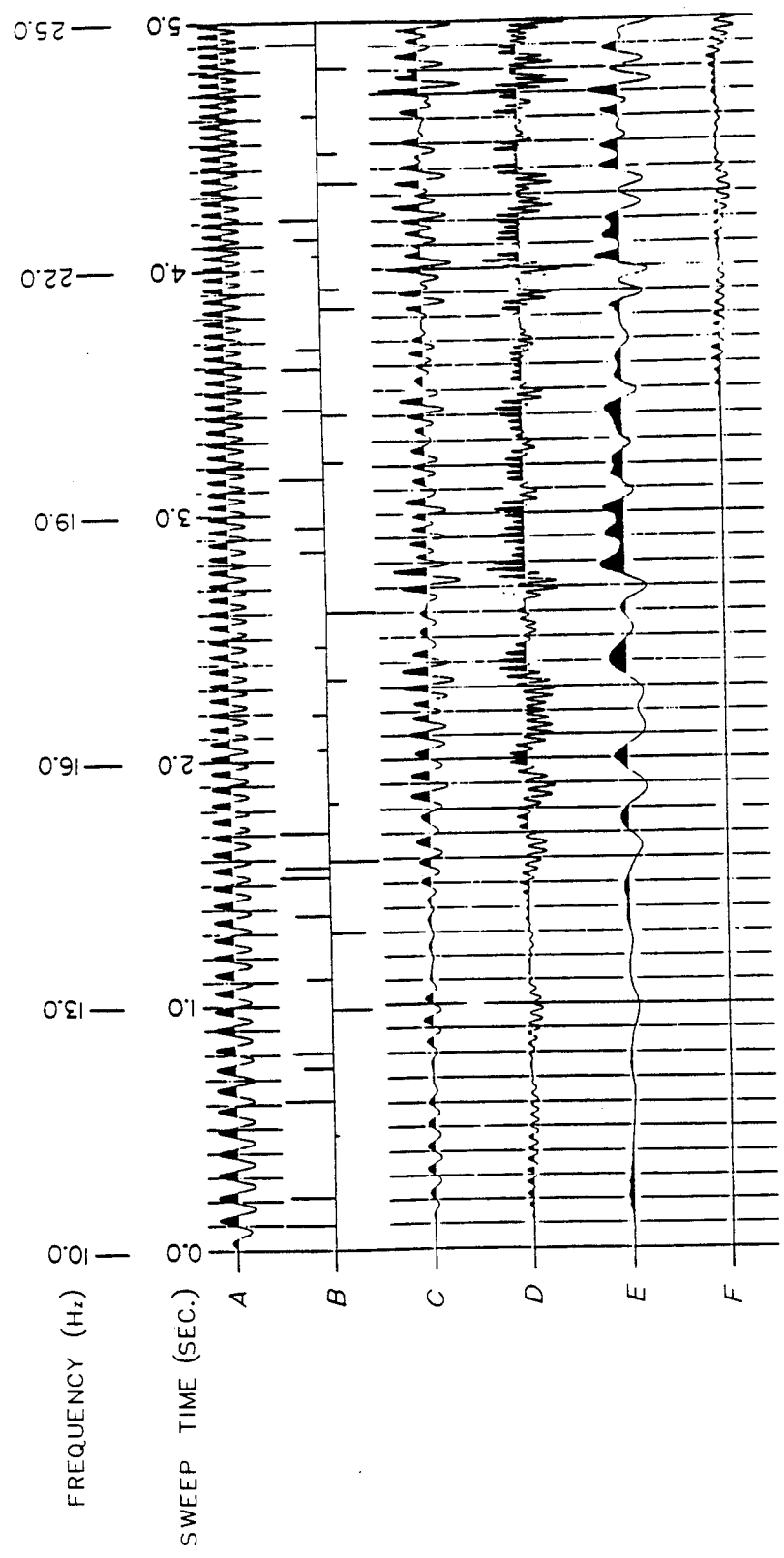
FIG. 8 A is a representation of the first half of a 10 to 40 Hz, 10 second sweep.
Figure 8:
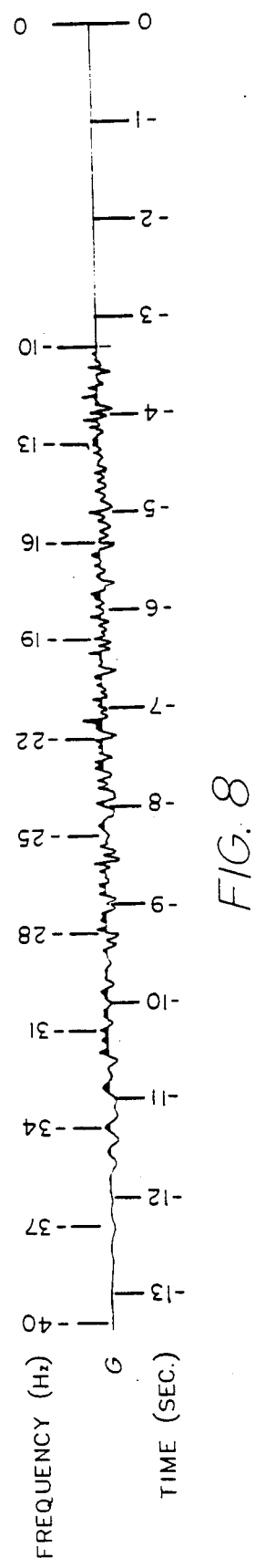
Figure 9:
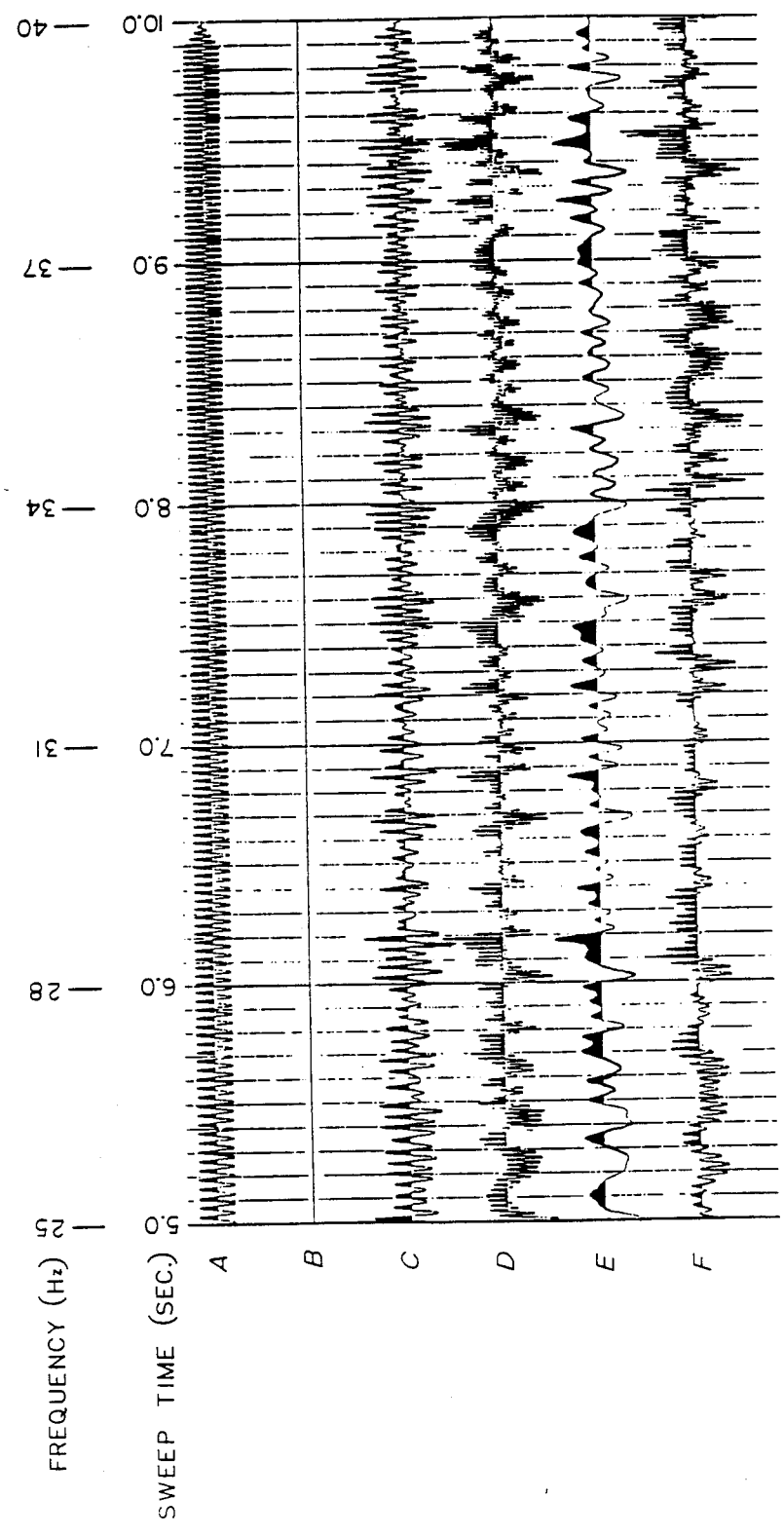
FIG. 9 plot A, a continuation of FIG. 8 plot A, is a representation of the second half of a 10 to 40 Hz, 10 second sweep.
Figure 9:
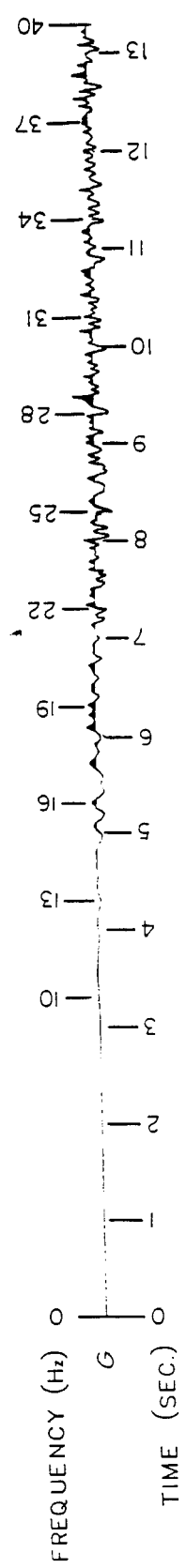

Thus, to calculate the second representation, the product values of the first representation are sequentially associated with positive values of time in the opposite half-plane to create a visually identical representation. These positive values of time sequentially associated with the product values of the first representation are selected so that, rather than decreasing from the time associated with the first, higher frequency limit to the time associated with the second, lower frequency limit as occurred in the first representation, the positive values of time sequentially increase from the negative of the value of time associated with the second, lower frequency limit to the negative of the value of time associated with the first, higher frequency limit. Consequently, in calculating the second representation, the product values of the first representation are sequentially associated with values of time in the opposite half-plane such that the second representation, when visually compared to the first representation, appears to be merely the result of placing the first representation in the opposite half plane between the negative of the value of time associated with the first frequency limit and the negative of the value of time associated with the second, lower frequency limit. Similarly, if a recorded window of data in the $t>0$ half-plane extends from $t_1$ to $t_2$, where $|t_1|>>0$, then the filtered product function placed into in the $t<0$ half-plane is identical from $-t_1$ to $-t_2$, such that 32. $f'(-t_1)=f'(t_2)$ and 33. $f'(-t_2)=f'(t_1)$ Thus, the values stored sequentially from $t_1$ to $t_2$ are stored sequentially in the $t<0$ half-lane from $-t_2$ to $-t_1$. Thus, to calculate the second representation, the product values of the first representation are sequentially associated with negative values of time in the opposite half-plane to create a visually identical representation. These negative values of time sequentially associated with the product values of the first representation are selected so that, rather than increasing from the time associated with the first, lower frequency limit to the time associated with the second, higher frequency limit as occurred in the first representation, the negative values of time sequentially decrease from the negative of the value of time associated with the second, higher frequency limit to the negative of the value of time associated with the first, lower frequency limit. Consequently, in calculating the second representation, the product values of the first representation are sequentially associated with values of time in the opposite half-plane such that the second representation, when visually compared to the first representation, appears to be merely the result of placing the first representation in the opposite half plane between the negative of the value of time associated with the first frequency limit and the negative of the value of time associated with the second, higher frequency limit. Regardless of whether an upsweep or a downsweep is performed, in addition to the calculation of the second representation in the opposite symmetric window across the $t=0$ axis, it is necessary to further define f'(t) such that f'(t)=0 where $|t_1|>|t|>|t_2|$. Referring now to FIGS. 8 and 9 plots A through G, an example of the calculation of a second phase consistent representation or the placing of the product of single sweep of input vibrations into the opposite half-plane can be demonstrated. This example uses as a source vibration an upsweep input vibration signal ranging from ten Hertz to forty Hertz, at a time rate of change of frequency of three Hz/sec., which is given in plot A. Plot B shows the reflection series used for this model, plot C shows the reflected signal, from the reflection series, received by the geophones at the surface, and plot D shows the product of the input sweep and the reflected signal, and plot E shows the 20 Hz low pass filtered product function f'(t) of this upsweep input signal with a reflection series having two-way times $t_r$ from 0.1 second to 4.9 seconds. Plots A through E are all based on the actual sweep time, that is, $t=0$ when the sweep begins. Plots F and G, however, reflect a shifting of the data consistent with the theory of an infinite sweep truncated into two windows of data. Plot F shows the first 10 seconds of the positive axis to be transformed. On the time scale of plot F, the filtered product of plot E has been shifted to an appropriately located window of data in an infinite sweep.

It should be apparent that the placing of the filtered product function into the opposite half-plane may be done with the product function as a function of time or as a function of source vibration frequency. Furthermore, once the placing of the data as a function of time or source vibration frequency is completed, the substitution of a frequency variable such as $q=2\alpha t$ can be performed. Referring to FIGS. 8 and 9, there is an upsweep from a lower first frequency limit, $q_1$, which is equal to 10 Hz., to a second higher frequency limit, $q_2$, which is equal to 40 Hz., a sweep time, T, of 10 seconds, and a sweep rate of $(q_2-q_1)/T=F$ of 3 Hz/sec. Assuming a sample rate of s, there are $T/s=n$ samples in the recorded data. The time and frequency axis in FIGS. 8 and 9 may be correlated by use of the formulas $q_1/F=t_1$ and $q_2/F=t_2$. Thus, in FIGS. 8 and 9, the lower time limit, $t_1$, is equal to 3.33 seconds and the upper time limit, $t_2$, is equal to 13.33 seconds. To calculate a second representation on the opposite negative half plane of the frequency or time axis so as to maintain phase consistency, the product values of the first representation are sequentially loaded, that is, in order from sample number 1 through sample number n in the opposite half-plane. This loading of product values begins with $-q_2$, which is $-40$ Hz., or $-t_2$, which is $-13.33$ seconds, and ends with $-q_1$, which is $-10$ Hz., or $-t_1$, which is $-3.33$ seconds. Assuming the incremental difference in frequency between samples is dq, the second representation for the frequency axis can be calculated as follows:

33A. $f(-q_2+(n-1)dq)=f(q_1+(n-1)dq)$.

Assuming the incremental difference in time between samples is dt, the second representation for the time axis can be calculated as follows:

33B. $f(-t_2+(n-1)dt)=f(t_1+(n-1)dt)$.

Similarly starting with a downsweep from a higher frequency limit, $-q_2$, which is $-40$ Hz., to a second, lower frequency limit, $-q_1$, which is $-10$ Hz., the same method can be carried out. To calculate a second representation on the opposite positive half plane of the frequency or time axis so as to maintain phase consistency, the sample product values of the first representation are sequentially loaded, that is, in order from sample number 1 through sample number n, beginning with $q_1$ equal to 10 Hz. or $t_1$ equal to 3.33 seconds, and ending with $q_2$ equal to 40 Hz. or $t_2$ equal to 13.33 seconds. Assuming the incremental difference in frequency between samples is dq, the second representation for the frequency axis can be calculated as follows:

33C. $f(q_1+(n-1)dq)=f(-q_2+(n-1)dq)$.

Assuming the incremental difference in time between samples is dt, the second representation for the time axis can be calculated as follows:

33D. $f(t_1+(n-1)dt)=f(-t_2+(n-1)dt)$.

Plot G shows that the filtered product function f'(q) in the frequency window, 10 Hz. to 40 Hz., has been placed into the window in the $q<0$ half-plane, in such manner that, using equations 28 and 29, $$f'(-40 \text{ Hz})=f'(10 \text{ Hz})$$

and $f'(-10 \text{ Hz})=f'(40 \text{ Hz})$

Also, it should be apparent that the values stored sequentially from f'(10 Hz) to f'(40 Hz) are, after placing, stored sequentially in the $q>0$ half-plane from f'($-40$ Hz) to f'($-10$ Hz). In addition, f'(q)=0 for all values between f'($-10$ Hz) and f'(10 Hz), and for all values such that $|q|>40$ Hz. By reference to FIG. 5 plot K, it should be apparent that the filtered product function of plot G in the $q<0$ half-plane is phase consistent with the filtered product function in the $q>0$ half-plane. This phase consistency removes the existence of the Hilbert transform terms which result from the inverse Fourier transform performed in the Chichinin technique; as discussed above, the Chichinin technique involved the creation of an even function of frequency q which, because of the symmetry about the $q=0$ axis, created a phase shift at the $q=0$ axis, and therefore phase inconsistency between the two half-planes of the filtered product function as shown in FIG. 3 plot q. By means of the placing technique, that is, the calculation of a second representation of the window of data, the same mathematical steps as discussed relative to the second prior technique can be done on the product function where the product function of the upsweep has been placed in the $t>0$, or $q>0$, half-plane.

Figure 10:
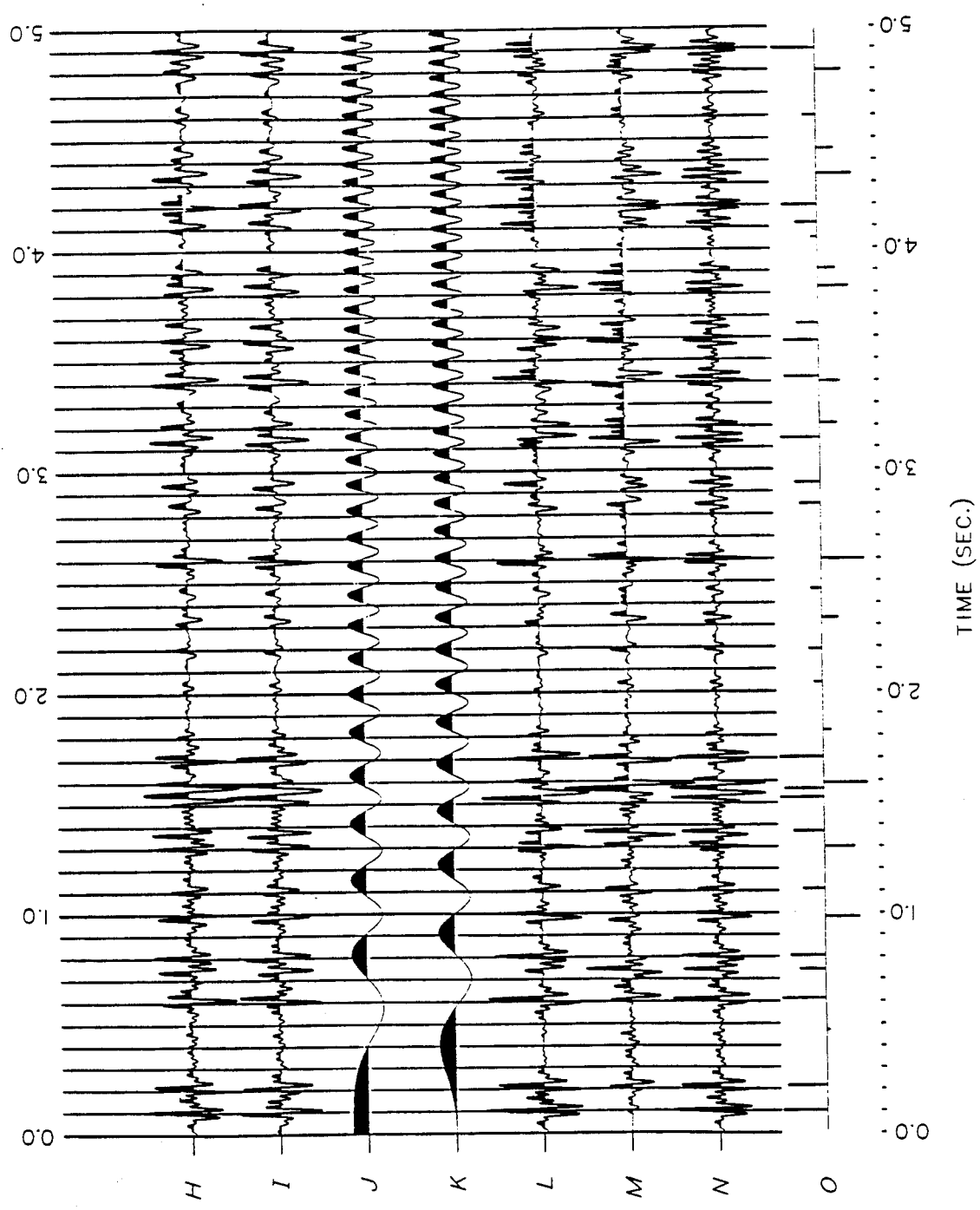
FIG. 10 plot H is a representation of the real part of the inverse Fourier Transform of the array shown in FIGS. 8 and 9 plot G.
Figure 11:
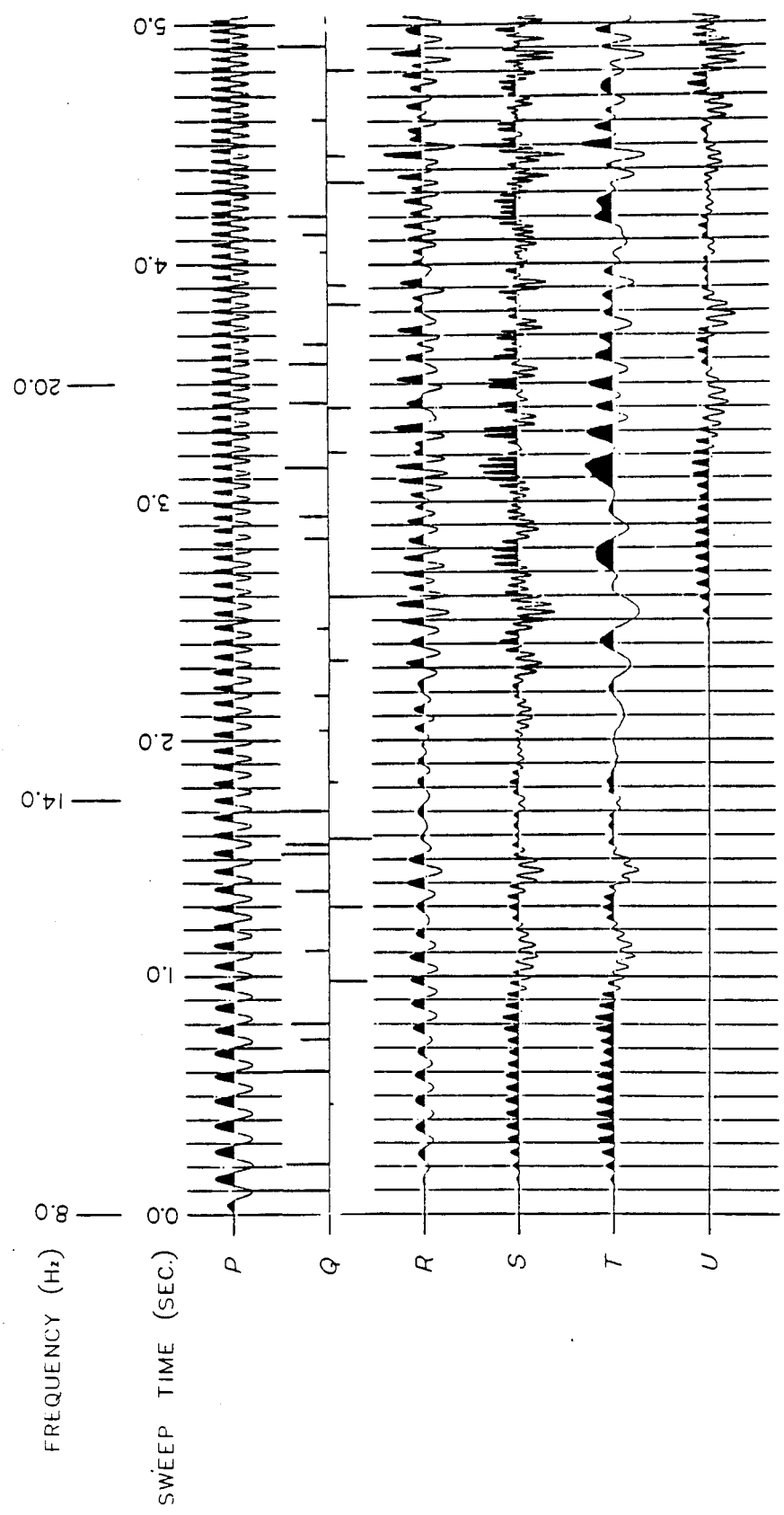
FIG. 11 plot P is a representation of the first five seconds of an 8 to 80 Hz, 21 second sweep.
Figure 12:
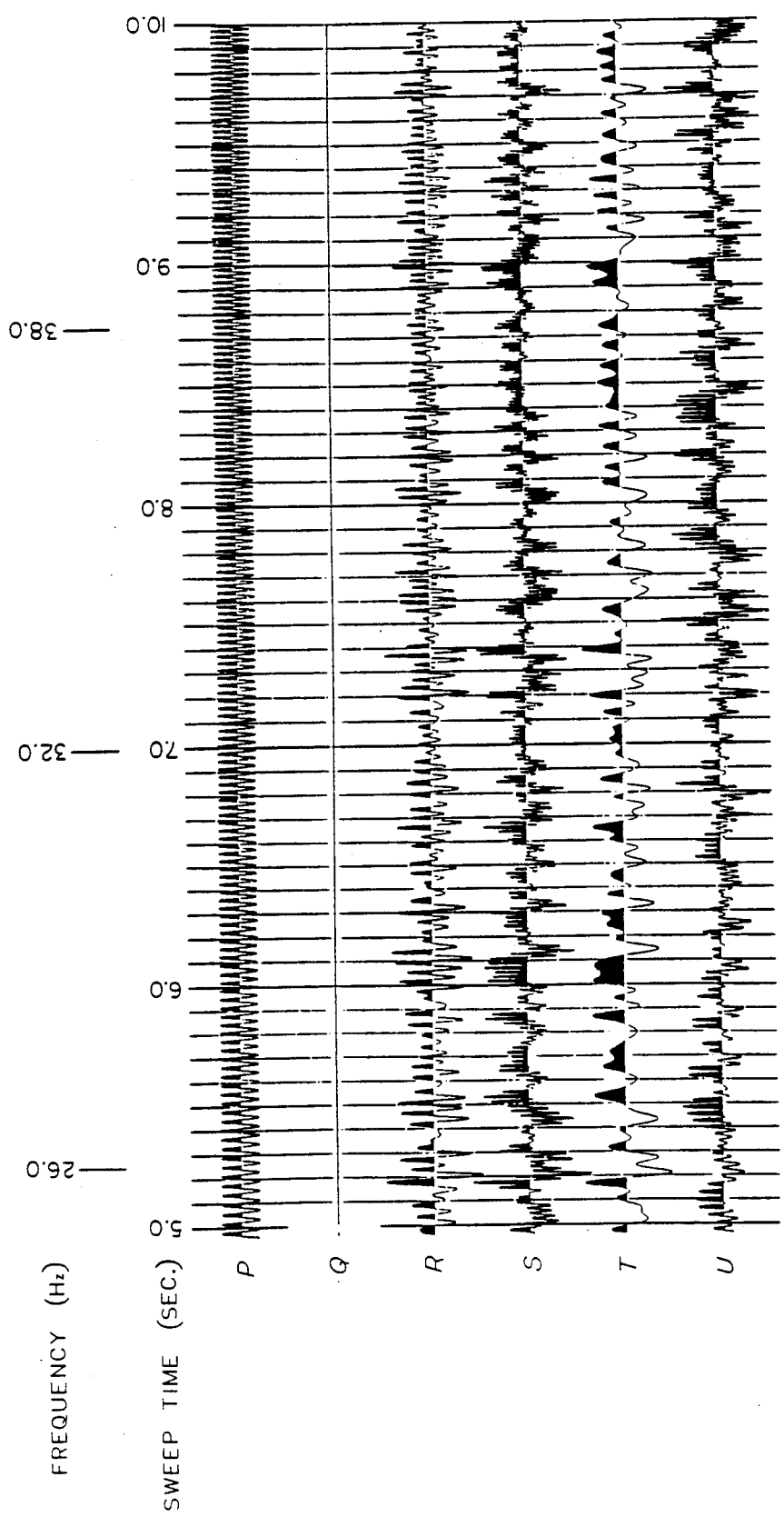
FIG. 12 plot P, a continuation of FIG. 11 plot P, is a representation of the second five seconds of an 8 to 80 Hz, 21 second sweep.
Figure 13:
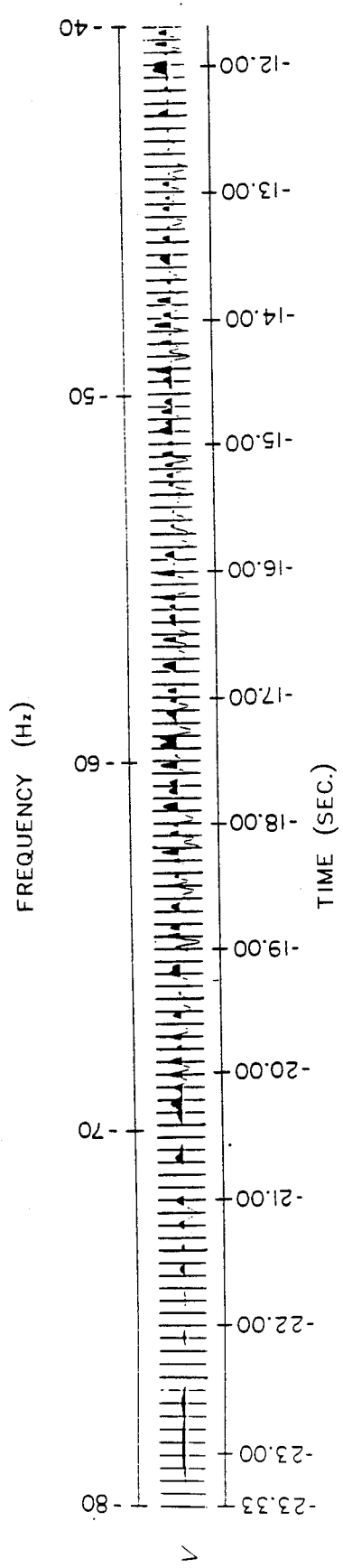
FIG. 13 plot V, is a representation (with filtered product) of the first half of the negative axis of the entire array to be transformed.
Figure 13:
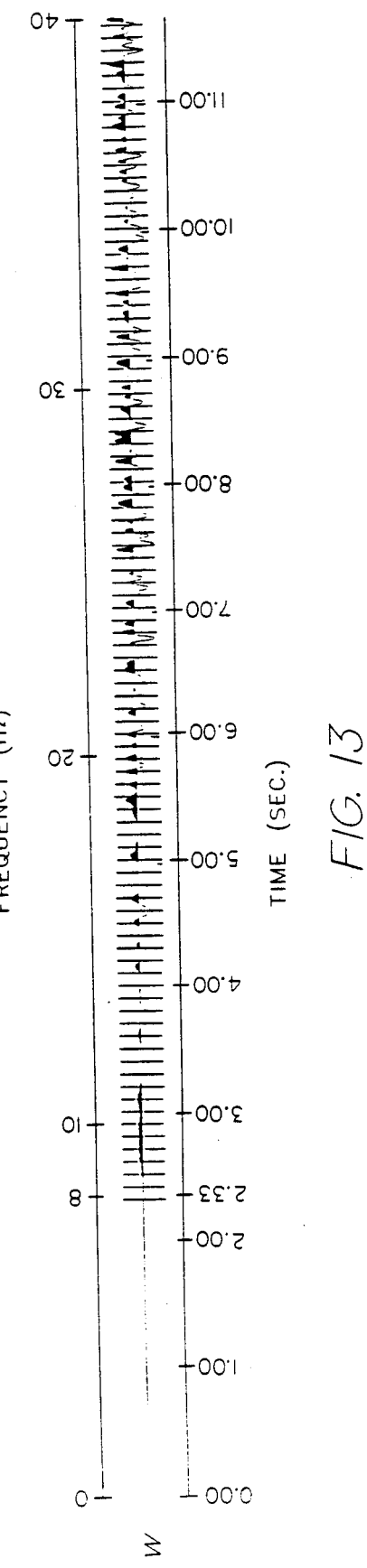
Figure 14:
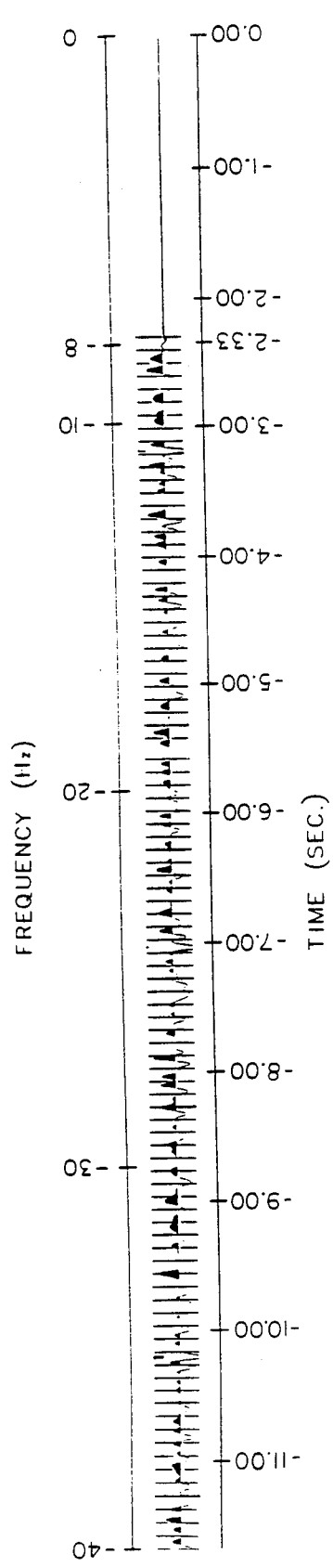
FIG. 14 plot V, a continuation of FIG. 13 plot W, is a representation of the second half of the negative axis of the entire array to be transformed.
Figure 14:
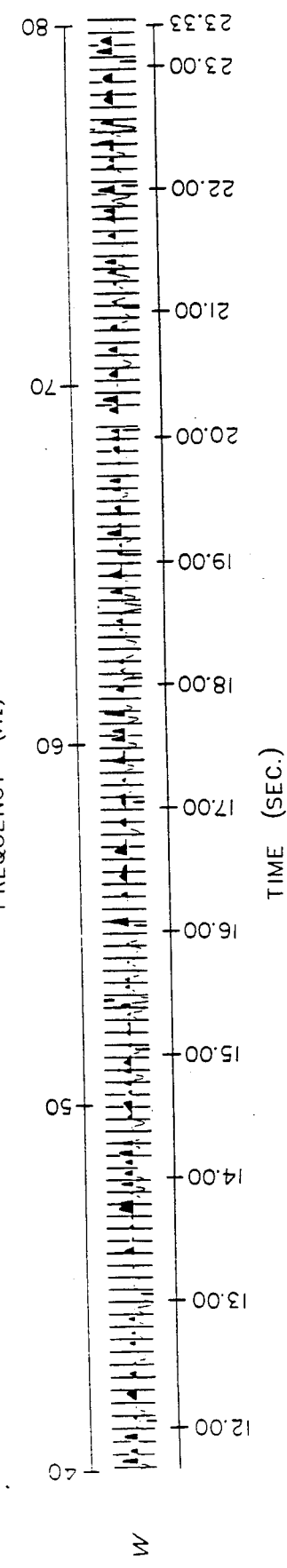

A graphical example of the remaining steps of the technique of this invention is instructive. FIG. 10 plots H and I show the Real and Imaginary outputs of the inverse Fourier Transform of the frequency domain function f'(q) derived from the substitution of q and $\Phi_r$ in equation 13 using the data contained in plot G. As discussed above in equation 22, the real part (plot H) is weighted by a cosine function (FIG. 10 plot J) and the imaginary part (FIG. 10 plot I) is weighted by a sine function (FIG. 10 plot K). As discussed above in equation 23 through 25, we now square these weighting functions by multiplying the Real Part by cos $\Phi$ (FIG. 10 plot L) and the Imaginary Part by sin (FIG. 10 plot M). The sum of these two products (FIG. 10 plot N) then results in the reflection series represented by zero phase wavelets of true amplitude and zero phase (FIG. 10 plot O).

A second example of the invention is provided in FIGS. 11, 12, 13, and 14. Referring to FIGS. 11, 12, 13, and 14 this example uses as a source vibration an upsweep input vibration signal ranging from 8 to 80 Hz, over 21 seconds, or at a time rate of change of frequency of 3.4286 Hz/sec., which is given in plot P. To facilitate understanding of these data, only the first ten seconds of the data is displayed in plots P through U. However, the complete reflection record is provided in FIGS. 13 and 14, which shows plots V and W. Plots V and W show both the filtered product and the calculated second representation of all 21 seconds of data. Plot Q shows the reflection series used for this model, plot R shows the reflected signal from the reflection series received by the geophones at the surface, plot S is the product of the input sweep and the reflected signal, and plot T, shows the 20 Hz low pass filtered product function f'(t) of this upsweep input signal with a reflection series having 2-way times $t_r$ from 0.1 second to 4.9 second. The time axis in plots P through T are all based on the actual sweep time, i.e., $t=0$ when the sweep begins at 8 Hz. Plots U, V, and W, however, reflect a shifting of the data consistent with the theory of an infinite sweep truncated into two windows of data. Plot U shows the first 10 seconds of the positive axis to be transformed. On the time scale of plot U, the filtered product of plot T has been shifted to an appropriately located window of data in an infinite sweep. Plot V and W include both a time and frequency axis. Plot V and W show that the filtered product function f'(q) in the frequency window, 8 Hz to 80 Hz, has been placed into the frequency window in the q<zero half-plane, in such a manner that, using equations 28 and 29, $$f(-80 \text{ Hz}) = f(8 \text{ Hz})$$

and $$f(-8 \text{ Hz}) = f(80 \text{ Hz})$$

Also, it should be apparent that the value stored sequentially from f'(8 Hz) to f'(80 Hz) are, after placing, stored sequentially in the q<zero half-plane from f'(−40 Hz) to f'(−10 Hz). In addition, f'(q)=0 for all values between f'(−10 Hz) and f'(10 Hz), and for all values where $|q|>40$ Hz. It should be apparent that the data has also been placed as a function of time in plots V and W. Furthermore, it should be noted that although plots V and W show amplitudes of zero at absolute values less than 8 Hz, the plots do not show amplitudes of zero at absolute values greater than 80 Hz. In addition, the plots do not show the data placed as a function of instantaneous frequency.

Figure 15:
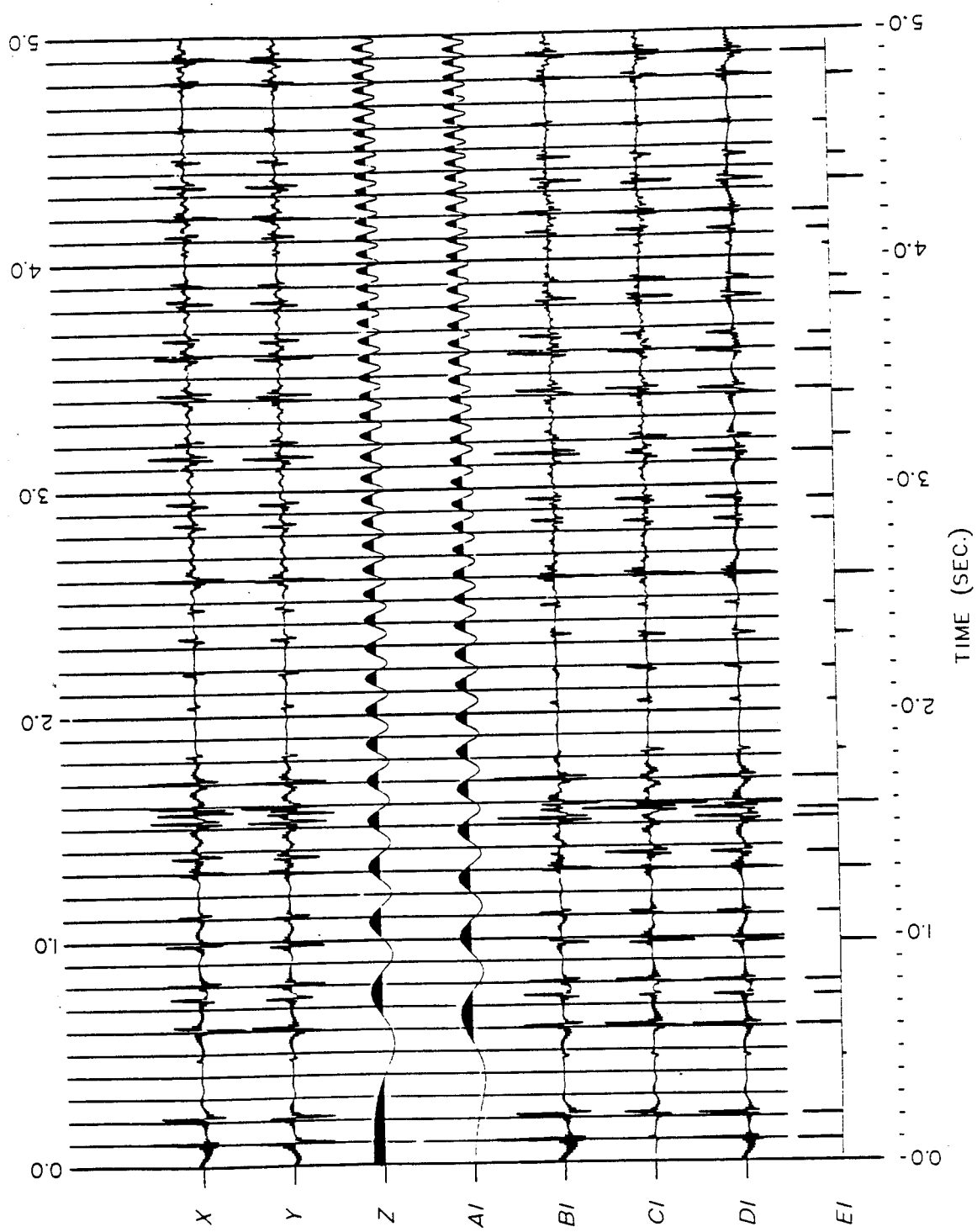
FIG. 15 plot X is a representation of the Real part of the Fourier Transform.

After the calculation of the second representation of the filtered product function, the remaining steps of the technique of the invention are as follows. FIG. 15 plot X and Y show the Real and Imaginary outputs of the inverse Fourier Transform of the frequency domain function f'(q) derived from the substitution of q and $\Phi_r$ in equation 13 using the data contained in plots V and W. As discussed above in equation 22, the Real Part (plot X) is weighted by a cosine function (FIG. 15 plot Z) and the Imaginary Part (FIG. 15 plot Y) is weighted by a sine function (FIG. 15 plot A1). As discussed above in equations 23 through 25, we now square these weighting functions by multiplying the Real Part by cosine $\Phi$ (FIG. 15 plot B1) and the Imaginary Part by sine $\Phi$ (FIG. 15 plot C1). The sum of these two products (FIG. 15 plot D1) then results in the reflection series represented by zero phase wavelets of true amplitude and zero phase (FIG. 15 plot E1).

Figure 16:
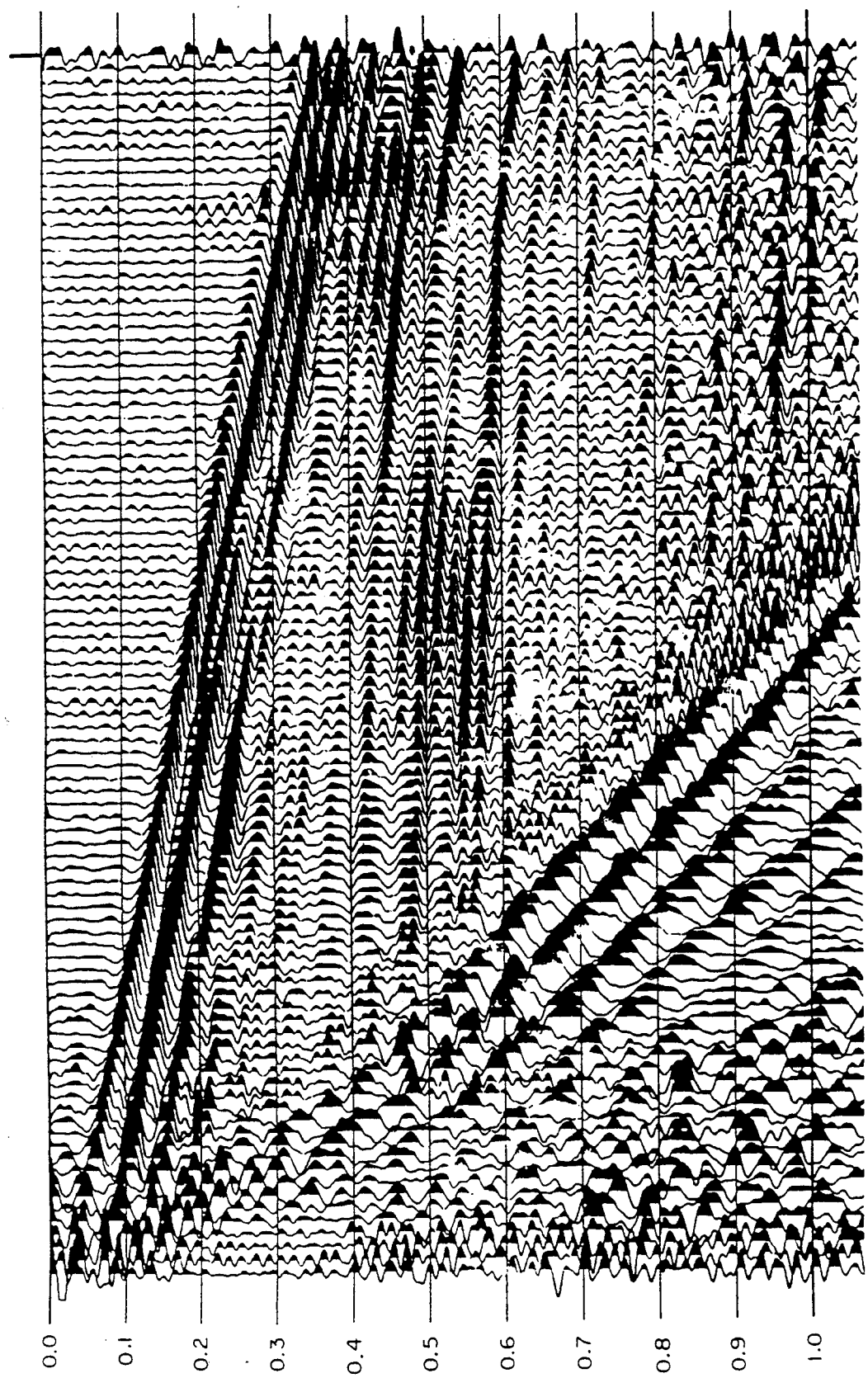
FIG. 16 is a representation of the results of a field test using the Hand method and an 8 to 80 Hz, 21 second sweep.

FIG. 16 is the actual recording of the data output of a field test using the Hand method. This field test used the same sweep as FIGS. 11, 12, 13, 14, and 15. In the field, four Y 1100 vibrators were used with a MDS-10, 96 trace recording system with the stations (geophone locations) 165 feet apart.

An alternative embodiment of the invention similarly avoids the phase inconsistency problems of the Chichinin technique without the necessity of performing a second sweep as in the second prior technique. Rather than calculating a second representation, values of zero are placed or loaded on the opposite half-plane of the frequency or time axis. Thus, referring to equation 18, rather than combining two representations in the form of equation 18 as required in the Hand Method, zeroes are loaded in the opposite half-plane. Thereafter, the mathematical steps described in equations 19–25 are carried out for the alternative embodiment in the same manner as carried out for the Hand Method. Thus, instead of calculating a second representation as shown in the opposite half plane of FIG. 8, plot G, the values of zero are placed in the opposite half plane. Similarly, in FIGS. 13 and 14, the alternative embodiment would not include the calculation of a second representation as shown in plot V. Thus, instead of using equations 33C and 33D, the values in the opposite half plane are set equal to zero. It should be noted, however, that the results using this alternative embodiment are not as good as the results using the Hand Method.

When recording with the Hand method or the alternative embodiment, as mentioned above, the data is a frequency domain representation of the reflection record. These frequencies will generally be in the zero to 25 Hz range. A high frequency component that is considered unwanted noise is also recorded. These high frequencies will generally range from 30 Hz to 240 Hz. If the Fourier Transform array contains enough spatial consideration for these high frequencies, they will not contribute to the reflection record of interest. A Fourier Transform array without enough spatial consideration for the high frequencies, however, will fold or alias these transformed frequencies into the frequency range of interest where they will interfere with the reflection record as noise. Under the previous second method, (FIGS. 4, 6, and 7), a Fast Fourier Transform was used to transform the recorded product. This transform array was not large enough to correctly place the sum frequency components in their correct time positions. Hence these sum frequencies would have been folded back or "aliased" into the time array with the difference frequency components. The solution to this problem was to filter these high frequencies with a low pass filter before transforming.

A discussion of the transform array is helpful. The output from the Fourier Transform has as many data points as the input to the Fourier Transform; however, the output axis size (in seconds) is defined by the "Nyquist" frequency of the input sample rate. The Nyquist frequency, which is a frequency associated with sampling, is equal to half the sampling frequency. For example, with a 2 millisecond (ms) sample rate, or 500 samples/second, the Nyquist frequency is 250 Hz. Thus, any sampled frequencies that are greater than the Nyquist frequency will "alias" as lower frequencies, from which they will be indistinguishable. With these concepts in mind, it is readily apparent that the invention allows control over the output sample rate in ways never before attainable with Vibroseis or dynamite.

If, for example, we have an 8 to 80 Hz. 21 sec. sweep, then $$\frac{f_h - f_l}{T}$$

is 3.4286 Hz/sec. The instantaneous frequency, $f_i$, of the difference frequency cosine term for a 5 sec. reflection is $(f_h - f_l)t_r/T = 17.1429$ Hz. After generating and sampling the data at 2 ms, and after calculating the product, we can then resample the data at 16 ms, since the Nyquist Frequency of 16 ms is 31.25 Hz. Dividing the Nyquist Frequency by $$\frac{f_h - f_l}{T}$$

the size of the array with respect to reflection times can be determined. Consequently, the output from the Fourier Transform, which has the limits of 31.25 Hz, can define reflections as great as 9.1146 seconds:

$$\frac{\text{Nyquist}}{\frac{f_h - f_l}{T}} = \frac{31.25 \text{ Hz}}{\frac{3.4286 \text{ Hz}}{\text{sec.}}} = 9.1146 \text{ sec}$$

To achieve a 2 ms output sample rate in the output array from the Fourier Transform, we need only load enough data in the real part of the Fourier Transform to give 4557.29 data points (9.114 sec/0.002 seconds/data point) in the positive half of the real part of the output from the Fourier Transform. (Depending on the Fourier Transform algorithm used, this could be the same number points as in the real part of the input array to the Fourier Transform, or some factor of 2.) This ability to control the output sample rate will result in higher resolution data, because sample rates of 1 ms, 0.5 ms or higher are achievable simply by loading the necessary amount of data in the output array from the Fourier Transform without any increase in field recording time or data storage. In addition, to simulate the mathematical principle of a truncated window function, zeros are loaded into the array at all points in the array corresponding to sweep frequencies outside the actual sweep frequencies. With the invention, there is also potential for higher resolution as a result of the ability to resample at a 16 millisecond rate. If a 48 second sweep generated at 2 ms were resampled at 16 ms, the data storage requirements would be no greater than those for a typical 12 second sweep with Vibroseis. With the resulting decrease in data storage requirements, it will be possible to take longer sweeps, in the range of 20 to 40 seconds, thereby providing better coupling to ground and better synchronization between vibrators.

A last aspect to consider about the Hand technique or the alternative embodiment is that it will also act as a noise filter. Many types of noise in the field, such as ground roll, electrical (60 Hz), wind, machinery, etc. tend to be band limited. If so, they will only contribute to the low frequency component of the reflection record when the sweep is relatively near (±20 Hz) to the noise frequency. After being sampled, the band-limited noise will not be represented by a unique frequency but instead will be spread out over a 20 Hz band width. Depending upon sweep rates, this could effectively eliminate 60% of band limited noise signal from a reflection record.

DESCRIPTION OF THE PREFERRED EMBODIMENT

Figure 17:
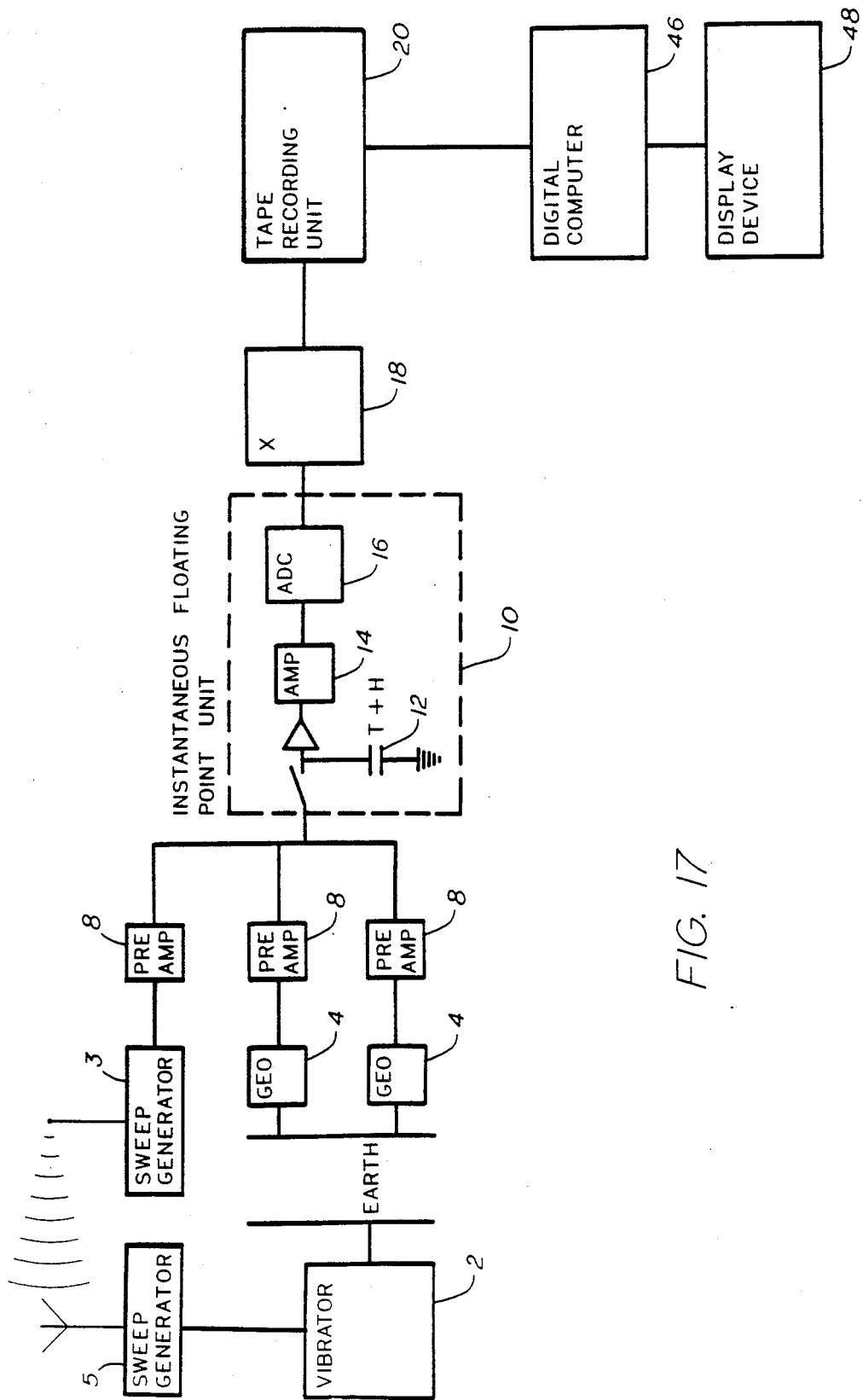
FIG. 17 is a block diagram of the preferred system embodying the invention.

FIG. 1 is a block diagram of the preferred system embodying the invention. Referring to FIG. 17, vibrator 2 provides either a downsweep or upsweep sinusoidal vibration into the earth with its frequency varying linearly with time; for purposes of this description, a downsweep (i.e., frequency decreasing linearly over time) will be used. In this embodiment, vibrator 2 is a Mertz Model #9 vibrator mounted on a 6'×6' truck, and controlled by Pelton Model 5 vibrator electronics. The downsweep signal typically occurs over a period of time ranging from ten to thirty seconds, and will typically have its frequency varying from 120 Hz to 20 Hz during such time. Sweep generator 3 transmits a syncpulse by radio wave to sweep generator 5 which drives vibrator 2. Reflections of the sweep signal from the interface of subsurface geological strata such as interface 6 shown in FIG. 1 are received by a number of geophones 4 such as Geosource MD 100, 10 Hz geophones, placed along the surface of the earth; the number of geophones 4 is commonly on the order of ninety-six, however, a greater or fewer number of geophones can be utilized in this embodiment, depending on the desired amount of data. The reflections sensed by geophones 4 are amplified by pre-amplifiers 8, such as are well-known in the art. The vibrator signal is similarly amplified by a pre-amplifier 8. The amplified signals from pre-amplifiers 8 are input to Instantaneous Floating Point ("IFP") unit 10 in parallel. IFP unit 10 consists of track and hold circuit 12, amplifier 14 and analog to digital converter 16; IFP unit 10 is a commonly used device in the art, as used for example in the Geosource 96 channel MDS-10 recording system or similar seismic recording systems. IFP unit 10 receives in parallel each of the analog signals from pre-amplifiers 8, samples each of the analog signals via track and hold circuit 12, amplifies the sampled signal via amplifier 14 and converts the sampled analog signal into a digital representation, typically of sixteen bits, via analog to digital converter 16.

The output of IFP unit 10 is a sequence of digital signals which represents the measured reflections at geophones 4 and the input sweep signal produced by vibrator 2, at each point in time that these analog signals are sampled. The input sweep signal vibrator 2 is, in this embodiment, derived from the identical electrical signal which drives vibrator 2 itself. The sampling rate is typically on the order of two milliseconds. The sequence of digital signals at the output of IFP unit 10 may be presented in various standardized formats; the format used in this embodiment is shown, in simplified form, by the timing diagram of FIG. 18. It should be understood that various formats may be used at the output of IFP unit 10, while remaining within the scope of the invention.

The output of IFP unit 10, in the embodiment of the invention, is in part directed to multiplier 18, with the remainder of the output of IFP unit 10 going directly to recording unit 20. It should be noted that in the use of a recording system such as the Geosource 96 channel MDS-10, prior to implementation of the invention in such applications as the VIBROSEIS system, the entire output of IFP unit 10 was directly connected to recording unit 20. However, as will be discussed more fully below in this embodiment, certain lines of the output of IFP unit 10 are connected instead to multiplier 18 for performance of the product of the input sweep waveform with the measured reflections.

Figure 18:
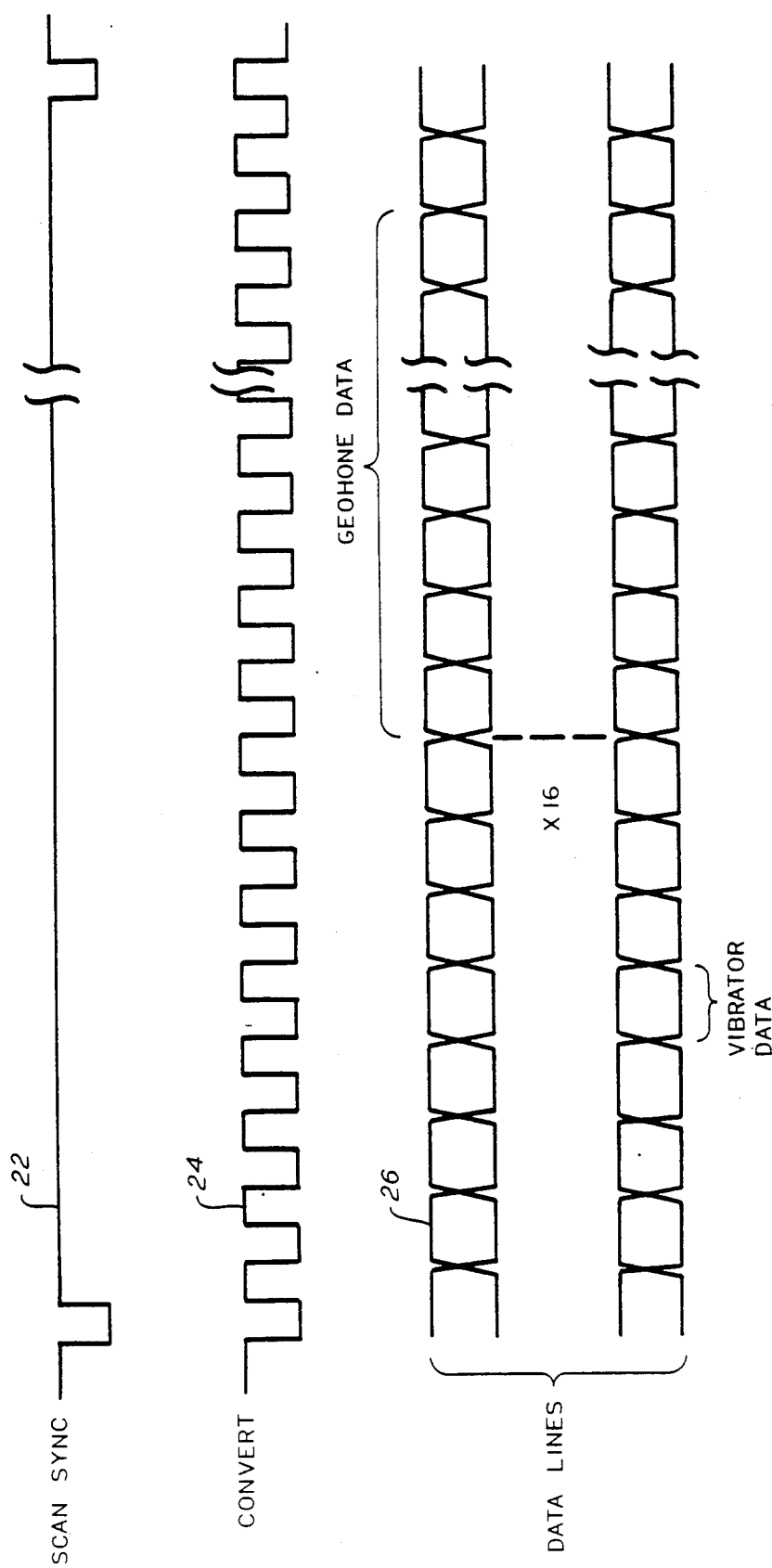
FIG. 18 is a timing diagram of the digital signals presenting data at the output of the instantaneous Floating Point insert.

Referring to FIG. 18, the format of the sequence of information at the output of IFP unit 10 is shown as a timing diagram of the digital signals in presenting data at the output of IFP unit 10. At time zero on FIG. 18, scan sync signal 22 pulses from a high to a low state, signifying the beginning of a sequence of data pertaining to a given sample of the outputs of pre-amplifiers 8. At each time that a new data word is presented on data lines 26 at the output of IFP unit 10, where data lines 26 typically number sixteen making each data word sixteen bits in parallel, convert signal 24 pulses from a high to a low state, signifying the presence of a new data word on data lines 26. In the format selected in this embodiment, the fourth data word after scan sync signal 22 goes low is the data word corresponding to the value of the input sweep signal generated by the sweep generator 5 to vibrator 2, noted on FIG. 18 as "VIBRATOR DATA." Also in this format, beginning with the eighth data word after scan sync signal 22, each data word comprises a digital representation of the sampled analog signal at the output of a pre-amplifier 8 relating to a specific geophone 4. Therefore, in this embodiment, the number of data words including and subsequent to the eighth data word after scan sync signal 22 pulses low, until such time as scan sync signal 22 again pulses low, is the number of geophones 4 from which measurement information is to be recorded. These data words on data lines 26 are noted as "GEOPHONE DATA" on FIG. 18.

It should be noted that control signal lines useful for recording the seismic data, as well known in the art, other than scan sync signal 22, convert signal 24 and data lines 26, exist at the output of IFP unit 10, but these signals are not necessary for the description of this embodiment of the invention.

Figure 19:
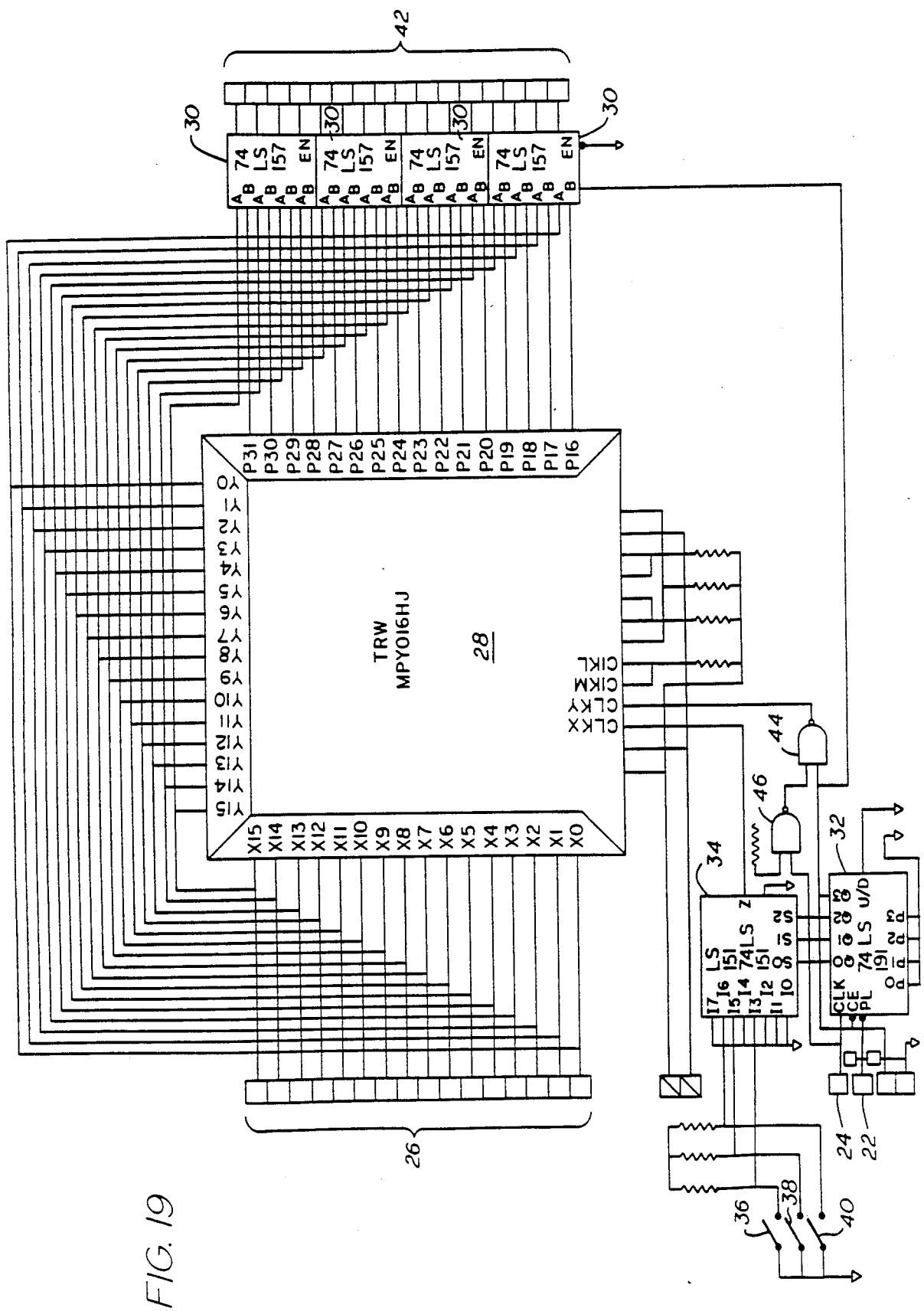
FIG. 19 is a schematic diagram of the multiplier.

FIG. 19 is a schematic diagram of multiplier 18. LSI multiplier 18 is an integrated circuit, as is well known in the art, such as a TRW MPY016HJ which is capable of multiplying two sixteen bit binary numbers and producing a sixteen bit binary output representing the output of the multiplication. As is shown in FIG. 19, data lines 26 are connected to inputs $X_o$ through $X_{15}$ of LSI multiplier 28, to inputs $Y_o$ through $Y_{15}$ of LSI multiplier 28, and to the "A" inputs of quad multiplexers 30. Quad multiplexers 30 are of a type well known in the art, such as the 74LS157 type. LSI multiplier 28 has control inputs CLKX and CLKY which control the multiplication process. When input CLKX makes a low voltage to high voltage transition with input CLKY at a low voltage, inputs $X_o$ through $X_{15}$ will be responsive to the data presented by data lines 26, and this data will be stored in a register internal to LSI multiplier 28. When input CLKX is at a low voltage and input CLKY makes a low voltage to high voltage transition, inputs $Y_o$ through $Y_{15}$ will be responsive to the data presented by data lines 26, and the number represented by this data will be multiplied by the number represented by the data stored in the internal register of LSI multiplier 28, with the sixteen bit binary representation of the product appearing at outputs $P_{16}$ through $P_{31}$ of LSI multiplier 28. Outputs $P_{16}$ through $P_{31}$ of LSI multiplier 28 are connected to the "B" inputs of quad multiplexers 30. The other control inputs to LSI multiplier 28 are biased in a manner well known in the art to effect the operation of LSI multiplier 28 described above.

In order for LSI multiplier 28 to properly multiply, for each sample in time, the digital representation of the sweep input of vibrator 2 by the digital representation of the measured signal from each geophone 4, inputs CLKX and CLKY of LSI multiplier 28 must be controlled so that input CLKX makes the transition to a high voltage with input CLKY at a low voltage when the digital representation of the sweep signal of vibrator 2 is present on data lines 26, and so that input CLKX is at a low voltage and input CLKY makes the transition to a high voltage each time that a data word representative of a measurement by each geophone 4 is present on data lines 26. Referring to FIGS. 18 and 19, convert signal 22 is connected to the "load" input of counter 32, which is a binary counter of a type well known in the art, such as the 74LS191 type. Since inputs $P_o$ through $P_3$ of counter 32 are grounded, when scan sync signal 26 pulses low, counter 32 is reset and will, upon each pulse of the CLK input of counter 32, increment the binary number represented at outputs $Q_o$ through $Q_3$, as the $-/D$ input of counter 32 is held at ground. Since convert signal 24 is connected to the CLK input of counter 32, each time convert signal 24 makes the transition from a low voltage to a high voltage, the binary number at outputs $Q_o$ through $Q_3$ of counter 32 will increment.

Data selector 34 is an integrated circuit of a type well known in the art, such as the 74LS151 type. Outputs $Q_o$ through $Q_2$ of counter 32 are connected to select inputs $S_o$ through $S_2$, respectively, of data selector 34. Data selector 34 operates, as is well known in the art, such that the voltage at the I input ($I_o$ through $I_7$) represented by the binary number present at select inputs $S_o$ through $S_2$ will appear at the Z output of data selector 34. Since switch 36 is open, placing a high voltage at input $I_4$ of data selector 34, and since all other inputs $I_o$ through $I_7$ are at ground potential either directly or through switches 38 and 40, the Z output of data selector 34 will have a high voltage only when the binary number represented at select inputs $S_o$ through $S_2$ of data selector 34 is the number "4". Therefore, upon the fourth pulse of convert signal 24 after the pulse of scan sync signal 22, outputs $Q_o$ through $Q_3$ of counter 32 will present a binary representation of the number "4" at the select inputs of data selector 34, driving a high voltage at the Z output of data selector 34. Z output of data selector 34 is directly connected to the CLKX input of LSI multiplier 28 which will, at that time, load the data word present on data lines 26 into the internal register of LSI multiplier 28. As discussed above, the data word associated with the fourth pulse of convert signal 24 after the low pulse of scan sync signal 22 is the binary representation of the sweep signal of vibrator 2, designated as "VIBRATOR DATA" on FIG. 18. Therefore, the digital representation of the sweep signal of vibrator 2 at the sampled time is stored in an internal register of LSI multiplier 28. It should be noted that if the location of the data word representative of the sweep signal is in a word other than the fourth data word, switches 36, 38 and 40 may be easily reset to reflect the actual position of this data word in the sequence. It should also be noted that the select input of quad multiplexers 30 is at a low voltage at this time, causing the quad multiplexers 30 to present at each output the voltage present at the "A" input. The select input of quad multiplexers 30 is at a low voltage after counter 32 has been reset by the low pulse of scan sync signal 22 until the count of counter 32 reaches the number "8", eight pulses of convert signal 24 after the low pulse of scan sync signal 22. Therefore, at such time as the sweep signal data of vibrator 2 is loaded into the internal register, output data lines 42 of multiplier 28 will be presenting the data present on data lines 26 to recording unit 20, as if multiplier 28 were not present, since the outputs of quad multiplexers 30 equal the "A" inputs of quad multiplexers 30.

After the loading of the internal register of LSI multiplier 28, subsequent pulses of convert signal 24 continue to increment the value at the output of counter 32 until output $Q_3$ of counter 32 goes high, upon the eighth pulse of convert signal 24 after the low pulse of scan sync signal 22. At this time, the high voltage at output $Q_3$ of counter 32 will also appear at the chip enable input of counter 32, as output $Q_3$ and the chip enable input of counter 32 are directly connected together, thereby stopping counter 32 at the count of eight and making counter 32 non-responsive to subsequent pulses of convert signal 24 until the next low pulse of scan sync signal 22 resets counter 32.

Output $Q_3$ of counter 32 is connected to an input of NAND gate 44. Convert signal 24, complemented by NAND gate 46, appears at the other input of NAND gate 44. The output of NAND gate 44, connected to the CLKY input of LSI multiplier 28, makes the transition from a low to a high voltage when output $Q_3$ of counter 32 is at a high voltage and when the complement of convert signal 24 makes a high to low transition (i.e., when convert signal 24 makes a low to high transition, as it does during each new data word presented on data lines 26). Therefore, beginning with the eighth pulse of convert signal 24 after the low pulse of scan sync signal 22, each pulse of convert signal 24 will cause input CLKY of LSI multiplier 28 to make a low to high transition, in turn causing the data word present on data lines 26 to be multiplied by the contents of the internal register of LSI multiplier 28, representative of the sweep signal of vibrator 2, and causing the binary representation of the product to appear at outputs $P_{16}$ through $P_{31}$ of LSI multiplier 28. Since output $Q_3$ of counter 32 is at a high voltage, the select input of quad multiplexers 30 is at a high voltage, causing data output lines 42 of multiplier 18 to represent the "B" inputs to quad multiplexers 30, namely the product of LSI multiplier 18. The process of clocking the CLKY input of LSI multiplier 28 for each data word representative of a measurement of a specific geophone 4, and thereby sequentially presenting the product of the sweep signal and the measurement of each geophone 4 at data output lines 28, will continue for all subsequent pulses of convert signal 24, and thereby for all new data words representative of measurements of geophones 4 at data lines 26, until the next low pulse of scan sync signal 22, signifying a new time sample of data received by IFP unit 10.

In this manner, multiplier 18 serves to intercept those sequential data words on data lines 26 from IFP unit 10 which represent the sequence of measurements from each geophone 4 for each samples, replacing these data words in each sample with data words representative of the product in each sample of the measurement of each geophone 4 within the sweep signal of vibrator 2 at the sampled point in time. It should be apparent that this operation occurs with no change in format of the data, so that multiplier 18 is transparent to recording unit 20.

Recording unit 20 receives the sequential data from multiplier 18 and records this data on magnetic tape, magnetic disk, or some other medium of computer memory. As discussed above, each high to low pulse of scan sync signal 22 corresponds to a sequence of data representative of one of the sampled points in time, where the data includes a digital representation of the amplitude of the vibrations produced by vibrator 2 at the sampled point in time, a digital representation of the measurements of each geophone 4, sensing reflections of vibrations from vibrator 2, also at the sampled point in time, and an explicit or implicit indication of the sampled point in time with which the sequence is associated. Since multiplier 18 in effect replaces the digital representations of the measurements of geophones 4 with digital representations of the products, the overall stream of data recorded is therefore an overall time sequence, over the entire sweep time, of the individual sequences of vibrator and product information pertaining to each sample point in time within the sweep time. In a typical application of this embodiment, the data recorded by recording unit 20 will consist of the product of the sweep signal of vibrator 2 and the measurement of each geophone 4, taken at a 2 millisecond sample rate.

Since the recorded sequence consists of the samples taken during the time of the sweep input signal, the stored data is therefore representative of the product function represented in FIGS. 8 AND 9 plot D, i.e., in one half-plane but unfiltered. In order to generate the entire reflection record, the remainder of the mathematical steps must be performed, as discussed above relative to the theory of operation of the invention. Digital computer 46 is a general purpose computer, such as the Digital Equipment Corporation VAX/780, having the capability of mathematical data processing. Digital computer 46 must place the half-plane data recorded by recording unit 20 into the opposite half plane; this placement can merely consist of loading the stored data into the active memory of digital computer 46, and copying the stored data into a separate location of memory, but with the products for each sampled point in time associated with a different point in time, as explained above relative to equations 29 and 32, to represent, in computer-readable form, phase-consistent representations of the product data as a function of time in both the $t<0$ and the $t>0$ half-planes. Alternatively, this placement can consist of loading the stored data into the active memory of digital computer 46, converting said data into a frequency-domain representation using the relationship of $q=2\alpha t$ discussed above, and then storing the converted data in the active memory of digital computer 46, and copying the converted stored data into a separate location of memory, but with the products of each sampled point associated with a different point in frequency, as explained above relative to equations 25 through 28, to represent, in computer-readable form, phase-consistent representations of the product data as a function of frequency in both the $q<0$ and $q>0$ half-planes. It should be noted that the method by which digital computer 26 associates each sample of stored product data may be done expressly by storing a representation of the sample time in memory, or implicitly by computing a sample time based upon knowledge of the sample rate and the sequence of sample data. It should also be noted that conversion of the time-domain representation of the stored product data into a frequency-domain representation, using the relationship of $q=2\alpha t$ discussed above, may be performed prior to, or after, the placing of the stored data into the opposite half-plane.

Figure 20A:
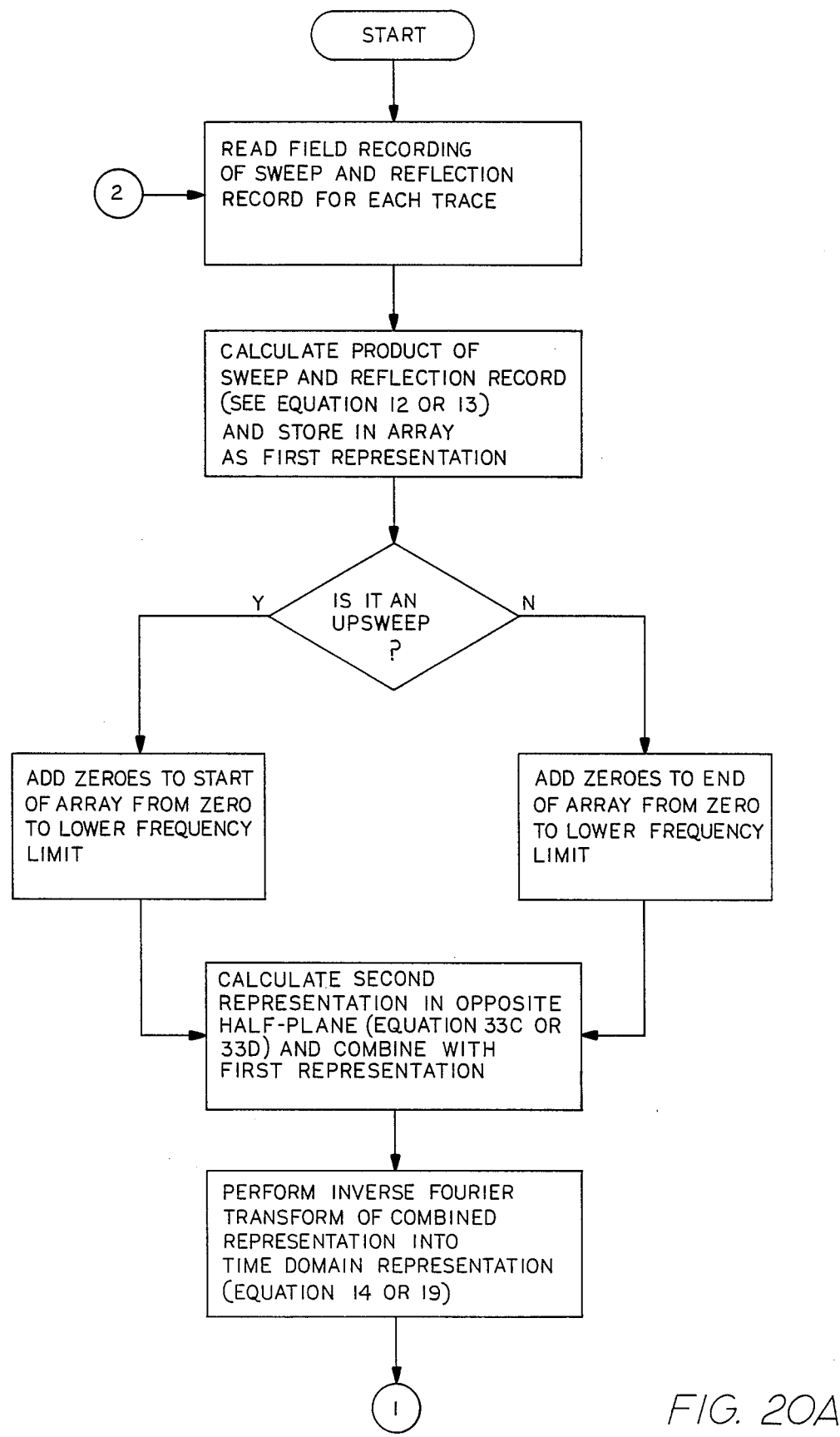
FIGS. 20A and B is a programming flowchart to be used in practicing the preferred embodiment of the invention.
Figure 20B:
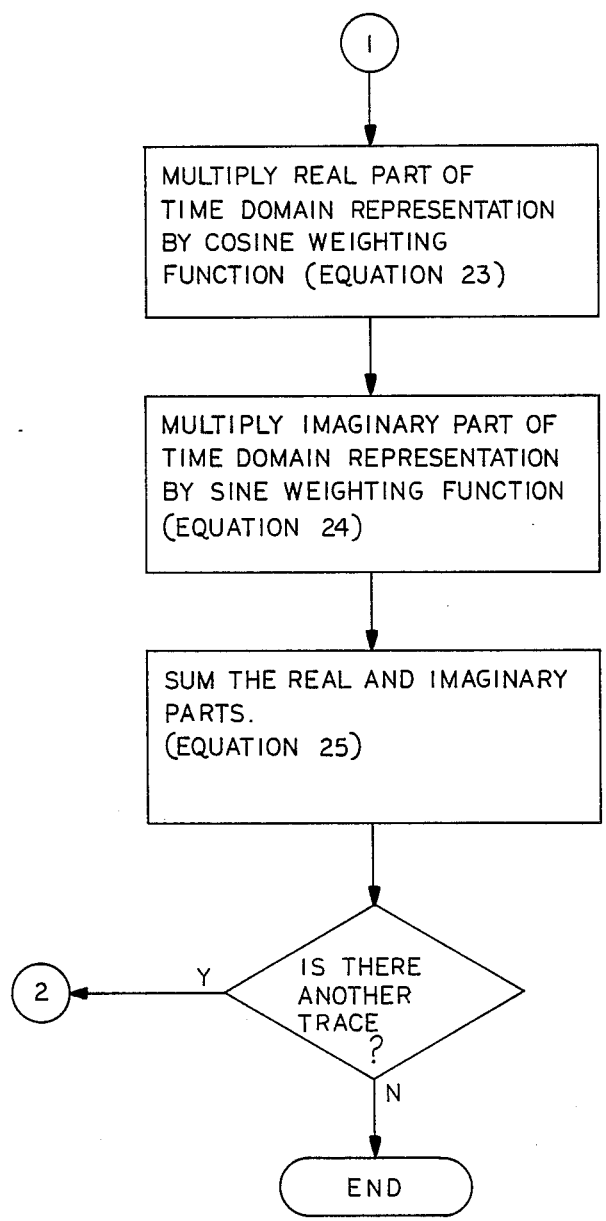
Figure 21A:
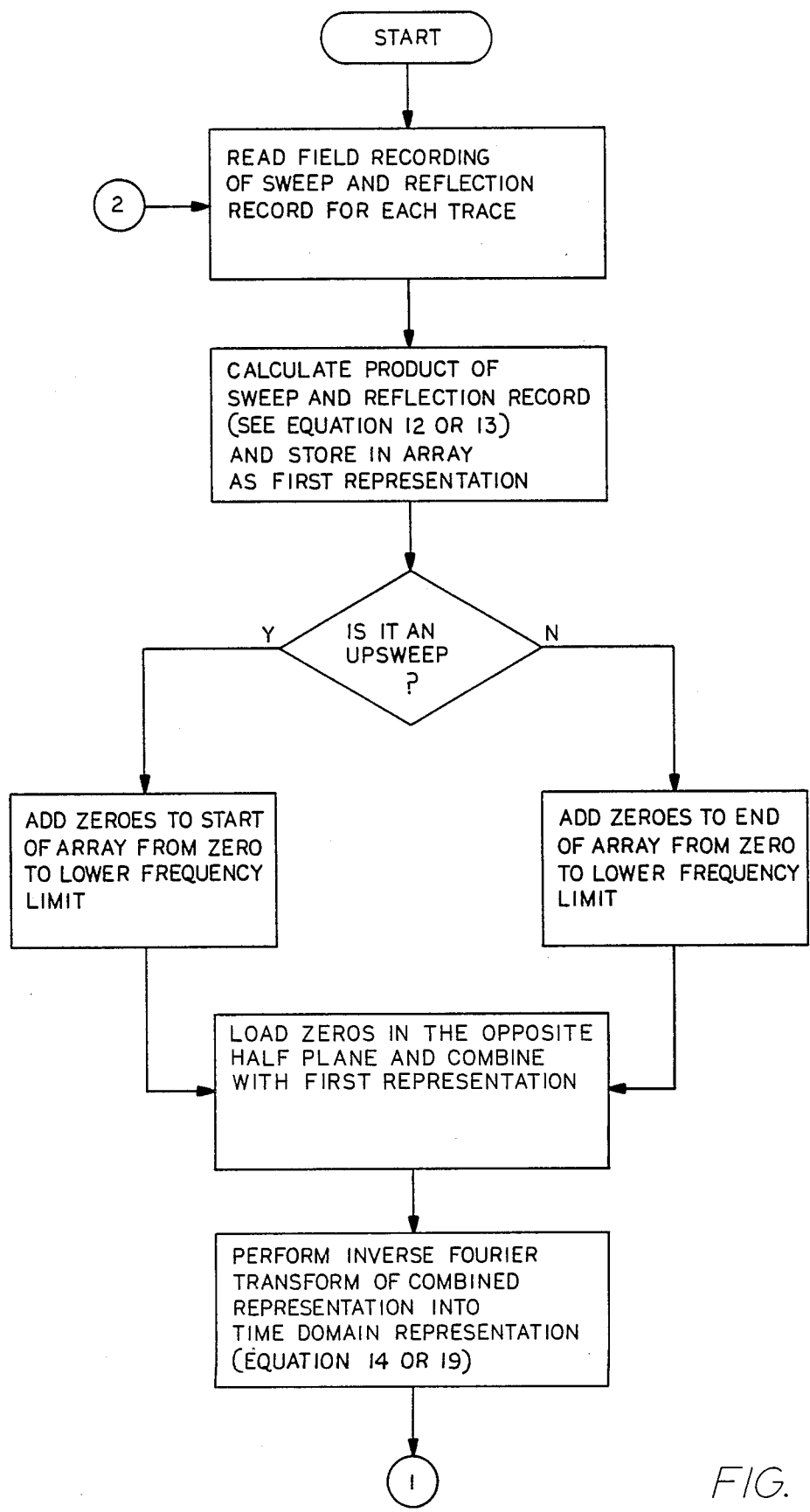
FIGS. 21A and B is a programming flowchart to be used in practicing an alternative embodiment of the invention.
Figure 21B:
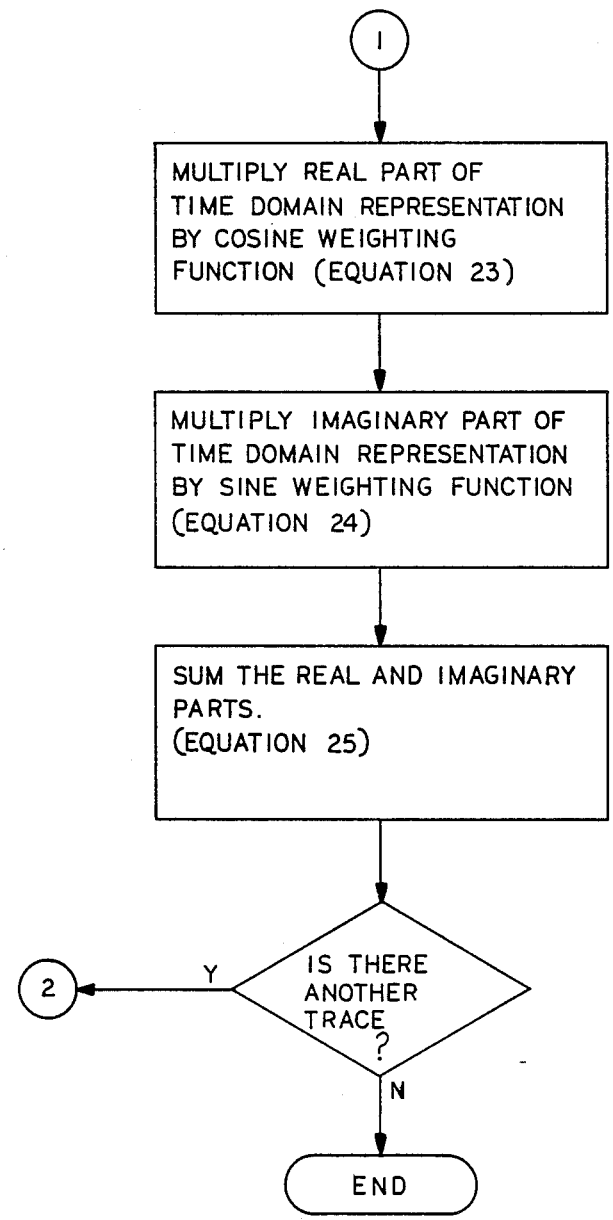

The program used by digital computer 46 in the preferred embodiment is based on the flowchart given in FIGS. 20A and B. (A flowchart that serves as the basis for the alternative embodiment is given in FIGS. 21A and B.) Such a program can be written in the Fortran language utilizing software available in the geophysical industry, such as Digicon Geophysical Corporation's DISCO* [*Registered trademark of Digicon Geophysical Corporation] and Floating Point System, Inc.'s FPS100 array processing software, which are well known in the art and used by numerous geophysical contractors in the industry.

As also discussed above, low-pass filtering of the sum frequency cosine term may be useful, especially where the reflections of the vibrations may have relatively long two way times. This filtering may be done by digital computer 26 at such times as most convenient; the stored product data may be filtered by means of a recursive digital filter algorithm prior to or after the "placing" step, or even after the inverse Fourier transform step. The choice of whether or not to perform such filtering, and at which stage in the process, may be dependent upon the type of subsurface geological formations encountered, and may not be known until after an unfiltered sweep has been analyzed.

Once digital computer 26 has calculated the second representation of the product data in the opposite half-plane, digital computer 26 may perform the inverse Fourier transform on the two combined representations of the product data. As noted above, amplitude values of zero are stored in association with the sweep frequencies outside the two windows of data. The inverse Fourier transform, transforming the frequency-domain representation of the stored and placed product data into a time-domain representation, may be done by any one of a number of "Fast Fourier Transform" algorithms, which are well-known in the art. The results of the inverse Fourier transform consist of a time-domain function having a real and an imaginary part, as discussed above relative to equation 22.

Upon completion of the inverse Fourier transform, digital computer 46 must complete the processing of the stored product data by multiplying the real and imaginary parts of the time-domain function by a cosine and sine time function, as discussed above relative to equations 22, 23, and 24, and summing the results, as discussed above relative to equation 25.

It should be noted that, the stored data consists of the series of products taken for each geophone at a relatively high sample rate, on the order of two millisecond. However, the subsequent processing of the stored product data need not use all samples in creating the reflection record, since the bandwidth of frequencies containing the reflection information is generally between zero and fifteen Hertz; using the product data from a sixteen millisecond sample rate is sufficient for such applications, and in effect, acts as a low-pass filter. However, since the stored data may be retained at the original sample rate (such as two milliseconds), the operator may perform the inverse Fourier transform and related steps on product data sampled at a slower sample rate (such as sixteen milliseconds) and, depending on the results, may regenerate the reflection record at a sample rate up to the original sample rate merely by accessing the stored data a second or multiple times.

The process performed by digital computer 46 must be done individually for each geophone station, so that each geophone station will be associated with a time-domain representation of the reflections it has sensed. (A geophone station generally consists of twelve, twenty-four, or thirty-six geophones, 4). This allows the presentation of the results as a spatial record. In addition, the results of this process may be further processed by digital computer 46 to incorporate stacking, weathering, normal move-out, and wave velocity corrections, as are well-known in the art, in order to correct for the spatial separation among geophone stations and also for artifacts within the trace of a single geophone station. After such further processing, if any, is done, digital computer 46 then communicates the results of the process to display device 48, which may be a plotter or cathode-ray-tube monitor, for viewing and geological and geophysical analysis by the geophysicist. The display created by display device 48, i.e., the reflection record, generally consists of a series of traces from each of geophone stations, with the traces arranged according to the surface distribution of the geophone stations, in a manner well-known in the art for analysis of the depth and location of subsurface geological strata and formations.

It should be apparent that the digital computer steps necessary in generating the reflection record may be performed either in the field immediately after the sweep is performed, or performed upon the stored data at a computing center away from the field.

Although the invention has been described in its preferred embodiment with particularity, it is to be understood that this disclosure has been made by way of example only, and that numerous changes in the details of the embodiment may be made without departing from the spirit and scope of the invention as hereinafter claimed.

What is claimed is:

1. A method for obtaining seismic vibrator reflection data concerning the location of subsurface geological formations, comprising the steps of:
   sinusoidally vibrating the earth with source vibrations in a single sweep having a frequency which is linearly varying over time between a first frequency limit and a second frequency limit;
   sensing over time reflections of the source vibrations from subsurface geological formations;
   mathematically multiplying over time the amplitude of the source vibrations by the amplitude of the sensed reflections;
   storing, in computer-readable form, the product of the amplitude of the source vibrations and the amplitude of the sensed reflections in association with a point in time associated with each product, whereby a first representation of the product as a function of time is stored in one half plane of a time axis;
   calculating, in computer-readable form, a second representation of the product of the amplitude of the source vibrations and the amplitude of the sensed reflections as a function of time in the opposite half plane of the time axis, by setting the product value of the second representation at the negative of the value of time associated with the first frequency limit equal to the product value of the first representation at the second frequency limit, by setting the product value of the second representation at the negative of the value of time associated with the second frequency limit equal to the product value of the first representation at the first frequency limit, and by sequentially associating the product values of the first representation with values of time in the opposite half plane between the negative of the value of time associated with the first frequency limit and the second frequency limit, so that when the second representation is viewed graphically, the second representation appears to be a copy of the first representation placed in symmetrically located window in the opposite half plane of the time axis;

mathematically combining the first representation, the second representation, and the value of zero for all other points in time into a combined representation on the time axis, whereby the first representation is phase consistent with the second representation;

mathematically transforming the combined representation into a time domain representation of said waveform indicating the delay times between the source vibrations and the sensed reflections of the vibrations; and displaying the results of the transforming step in a form adopted to geophysical analysis.

2. A method as claimed in claim wherein the calculating step comprises:

calculating, in computer-readable form, a second representation of the product of the amplitude of the source vibrations and the amplitude of the sensed reflections as a function of time in the opposite half-plane of the time axis, by associating the product values of the first representation with values of time in the opposite half-plane of the time axis, wherein the values of time associated with the second representation in the opposite half- plane of the time axis are between two values of time that have the same absolute values as the two values of time associated with the commencement and conclusion of the sweep, and whereby the second representation, when viewed graphically, appears to be a copy of the first representation that has been placed in a symmetrically located window in the opposite half-plane of the time axis;

3. A method for obtaining seismic vibrator reflection data concerning the location of subsurface geological formations, comprising the steps of:

sinusoidally vibrating the earth with source vibrations in a single sweep having a frequency which is linearly varying over time between a first frequency limit and a second frequency limit;

sensing over time reflections of the source vibrations from subsurface geological formations;

mathematically multiplying over time the amplitude of the source vibrations by the amplitude of the sensed reflections;

storing, in computer-readable form, the product of the amplitude of the source vibrations and the amplitude of the sensed reflections in association with a point in time associated with each product, whereby a first representation of the product as a function of time is stored in one half plane of a time axis;

mathematically combining the first representation with values of zero for all other points in time;

mathematically transforming the combined representation into a time domain representation of said waveform indicating the delay times between the source vibrations and the sensed reflections of the vibrations; and displaying the results of the transforming step in a form adopted to geophysical analysis.

4. A method as claimed in claims 1 or 3, wherein the transforming step comprises:

linearly transforming the combined representation of the product as a function of time into a representation of the product as a function of source vibration frequency; and mathematically transforming the combined representation of the product as a function of source vibration frequency into a time domain representation of said waveform indicating the delay times between the source vibrations and the sensed reflections of the vibrations.

5. A method as claimed in claims 1 and 3, wherein the transforming step comprises:

linearly transforming the combined representation of the product as a function of time into a representation of the product as a function of frequency; and mathematically transforming the combined representation of the product as a function of frequency into a time domain representation of said waveform indicating the delay times between the source vibrations and the sensed reflections of the vibrations.

6. A method as claimed in claims 1 or 3, further comprising: wherein the transforming step comprises:

linearly transforming the combined representation of the product as a function of time into a representation of the product as a function of source vibration frequency;

performing, by means of a digital computer, an inverse Fourier transform on the combined representation of the product as a function of source vibration frequency, resulting in a time-domain representation of said stored representations having a real and an imaginary part;

mathematically multiplying the real part of said time-domain representation times the cosine of a time function;

mathematically multiplying the imaginary part of said time-domain representation times the sine of said time function; and mathematically adding the multiplied real and imaginary parts, said sum indicating the delay times between the vibrations and the sensed reflections of the vibrations.

7. A method as claimed in claims 1 or 3, wherein: the transforming step comprises:

linearly transforming the combined representation of the product as a function of time into a representation of the product as a function of frequency;

performing, by means of a digital computer, an inverse Fourier transform on the combined representation of the product as a function of frequency, resulting in a time-domain representation of said stored representations having a real and an imaginary part;

mathematically multiplying the real part of said time-domain representation times the cosine of a time function;

mathematically multiplying the imaginary part of said time-domain representation times the sine of said time function; and mathematically adding the multiplied real and imaginary parts, said sum indicating the delay times between the vibrations and the sensed reflections of the vibrations.

8. A method as claimed in claims 1 or 3 wherein the storing step comprises:

storing, in computer readable form, the product of the amplitude of the source vibrations and the amplitude of the sensed reflections in association with the source vibration frequency associated with each product, in such a manner that a first representation of the product as a function of source vibration frequency is stored;

and wherein the transforming step comprises:

mathematically transforming the combined representation of the product as a function of source vibration frequency into a time domain representation of said waveform indicating the delay times between the source vibrations and the sensed reflections of the vibrations.

9. A method for obtaining seismic vibrator reflection data concerning the location of the subsurface geological formations, comprising the steps of:

sinusoidally vibrating the earth with source vibrations having a frequency which is linearly increasing with time from a first frequency limit associated with a point in time, $t_1$, to a second, higher, frequency limit, associated with a point in time, $t_2$;

sensing over the time interval between $t_1$ and $t_2$ reflections of the source vibrations from subsurface geological formations;

mathematically multiplying over the time interval between $t_1$ and $t_2$ the amplitude of the source vibrations by the amplitude of the sensed reflections;

storing, in computer-readable form, the product over the time interval between $t_1$ and $t_2$ of the amplitude of the source vibrations and the amplitude of the sensed reflections in association with a point in time associated with each product, such that a first representation of said products as a function of time is stored;

calculating, in computer-readable form, a second representation of the product of the amplitude of the source vibrations and the amplitude of the sensed reflections as a function of negative values of time between $-t_1$ and $-t_2$ by sequentially associating the negative values of time with the product values of the first representation such that the negative values of time sequentially decrease from the negative of the value of time associated with the second, higher, frequency limit, to the negative of the value of time associated with the first frequency limit;

mathematically combining the first representation, the second representation, and the value of zero for all other points in time into a combined representation, which is a function of time, whereby the first representation is phase consistent with the second representation;

mathematically transforming the combined representation into a time domain representation of said waveform indicating the delay times between the source vibrations and the sensed reflections of the vibrations; and displaying the results of the transforming step in a form adopted to geophysical analysis.

10. A method for obtaining seismic vibrator reflection data concerning the location of the subsurface geological formations, comprising the steps of:

sinusoidally vibrating the earth with source vibrations having a frequency which is linearly increasing with time from a first frequency limit associated with a point in time, $t_1$, to a second, higher, frequency limit, associated with a point in time, $t_2$;

sensing over the time interval between $t_1$ and $t_2$ reflections of the source vibrations from subsurface geological formations;

mathematically multiplying over the time interval between $t_1$ and $t_2$ the amplitude of the source vibrations by the amplitude of the sensed reflections;

storing, in computer-readable form, the product over the time interval between $t_1$ and $t_2$ of the amplitude of the source vibrations and the amplitude of the sensed reflections in association with a point in time associated with each product, such that a first representation of said products as a function of time is stored;

mathematically combining the first representation with the value of zero for all other points in time into a combined representation, which is a function of time;

mathematically transforming the combined representation into a time domain representation of said waveform indicating the delay times between the source vibrations and the sensed reflections of the vibrations; and displaying the results of the transforming step in a form adopted to geophysical analysis.

11. A method as claimed in claims 9 or 10 wherein the transforming step comprises:

linearly transforming the combined representation of the product as a function of time into a representation of the product as a function of source vibration frequency; and mathematically transforming the combined representation of the product as a function of source vibration frequency into a time domain representation of said waveform indicating the delay times between the source vibrations and the sensed reflections of the vibrations.

12. A method for as claimed in claims 9 or 10 wherein the transforming step comprises:

linearly transforming the combined representation of the product as a function of time into a combined representation of the product as a function of frequency; and mathematically transforming the combined representation of the product as a function of frequency into a time domain representation of said waveform indicating the delay times between the source vibrations and the sensed reflections of the vibrations.

13. A method as claimed in claims 9 or 10 wherein the transforming step comprises:

linearly transforming the combined representation of the product as a function of time into a representation of the product as a function of source vibration frequency; and performing, by means of a digital computer, an inverse Fourier transform on the combined representation of the products as a function of source vibration frequency, resulting in a time-domain representation of said stored representations having a real and an imaginary part;

mathematically multiplying the real part of said time-domain representation times the cosine of a time function;

mathematically multiplying the imaginary part of said time-domain representation times the sine of said time function; and mathematically adding the multiplied real and imaginary parts, and sum indicating the delay times between the vibrations and the sensed reflections of the vibrations.

14. A method as claimed in claims 9 wherein the transforming step comprises:
linearly transforming the combined representation of the product as a function of time into a representation of the product as a function of frequency;
performing, by means of a digital computer, an inverse Fourier transform on the combined representation of the product as a function of frequency, resulting in a time-domain representation of said stored representations having a real and an imaginary part;
mathematically multiplying the real part of said time-domain representations times the cosine of a time function;
mathematically multiplying the imaginary part of said time-domain representation times the sine of said time function; and
mathematically adding the multiplied real and imaginary parts, said sum indicating the delay times between the vibrations and the sensed reflection of the vibrations.

15. A method as claimed in claims 10 wherein the transforming step comprises:
linearly transforming the combined representation of the product as a function of time into a representation of the product as a function of frequency;
performing, by means of a digital computer, an inverse Fourier transform on the combined representation of the product as a function of frequency, resulting in a time-domain representation of said stored representations having a real and an imaginary part;
mathematically multiplying the real part of said time-domain representations times the cosine of a time function;
mathematically multiplying the imaginary part of said time-domain representation times the sine of said time function; and
mathematically adding the multiplied real and imaginary parts, said sum indicating the delay times between the vibrations and the sensed reflection of the vibrations.

16. A method for obtaining seismic vibrator reflection data concerning the location of the subsurface geological formations, comprising the steps of:
sinusoidally vibrating the earth with source vibrations having a frequency which is linearly decreasing with time from a first frequency limit associated with a point in time, $-t_2$, to a second, lower, frequency limit, associated with a point in time, $-t_1$;
sensing over the time interval between $-t_2$ and $-t_1$ reflections of the source vibrations from subsurface geological formations;
mathematically multiplying over the time interval between $-t_1$ and $-t_2$ the amplitude of the source vibrations by the amplitude of the sensed reflections;
storing, in computer-readable form, the product of the amplitude of the source vibrations and the amplitude of the sensed reflections in association with a point in time associated with each product, such that a first representation of said products as a function of time is stored;
calculating, in computer-readable form, a second representation of the product of the amplitude of the source vibrations and the amplitude of the sensed reflections as a function of positive values of time between $+t_1$ and $+t_2$ by sequentially associating the positive values of time with the product values of the first representation such that the positive values of time sequentially increase from the negative of the value of time associated with the second, lower, frequency limit, to the negative of the value of time associated with the first frequency limit;
mathematically combining the first representation, the second representation, and the value of zero for all other points in time into a combined representation, which is a function of time, whereby the first representation is phase consistent with the second representation;
mathematically transforming the combined representation into a time domain representation of said waveform indicating the delay times between the source vibrations and the sensed reflections of the vibrations; and
displaying the results of the transforming step in a form adopted to geophysical analysis.

17. A method for obtaining seismic vibrator reflection data concerning the location of the subsurface geological formations, comprising the steps of:
sinusoidally vibrating the earth with source vibrations having a frequency which is linearly decreasing with time from a first frequency limit associated with a point in time, $-t_2$, to a second, lower, frequency limit, associated with a point in time, $-t_1$;
sensing over the time interval between $-t_2$ and $-t_1$ reflections of the source vibrations from subsurface geological formations;
mathematically multiplying over the time interval between $-t_1$ and $-t_2$ the amplitude of the source vibrations by the amplitude of the sensed reflections;
storing, in computer-readable form, the product of the amplitude of the source vibrations and the amplitude of the sensed reflections in association with a point in time associated with each product, such that a first representation of said products as a function of time is stored;
mathematically combining the first representation with the value of zero for all other points in time into a combined representation, which is a function of time;
mathematically transforming the combined representation into a time domain representation of said waveform indicating the delay times between the source vibrations and the sensed reflections of the vibrations; and
displaying the results of the transforming step in a form adopted to geophysical analysis.

18. A method as claimed in claims 16 and 17 wherein the transforming step comprises:
linearly transforming the combined representation of the product as a function of time into a representation of the product as a function of source vibration frequency; and
mathematically transforming the combined representation of the product as a function of source vibration frequency into a time domain representation of said waveform indicating the delay times between the source vibrations and the sensed reflections of the vibrations.

19. A method as claimed in claims 16 and 17 wherein the transforming step comprises:
   linearly transforming the combined representation of the product as a function of time into a combined representation of the product as a function of frequency; and
   mathematically transforming the combined representation of the product as a function of frequency into a time domain representation of said waveform indicating the delay times between the source vibrations and the sensed reflections of the vibrations.

20. A method as claimed in claim 16 or 17 wherein the transforming step comprises:
   linearly transforming the combined representation of the product as a function of time into a representation of the product as a function of source vibration frequency;
   performing, by means of a digital computer, an inverse Fourier transform on the combined representation of the products as a function of source vibration frequency, resulting in a time-domain representation of said stored representations having a real and an imaginary part;
   mathematically multiplying the real part of said time-domain representation times the cosine of a time function;
   mathematically multiplying the imaginary part of said time-domain representation times the sine of said time function; and
   mathematically adding the multiplied real and imaginary parts, the result of said addition indicating the delay times between the source vibrations and the sensed reflections of the vibrations.

21. A method as claimed in claim 16 wherein the transforming step comprises:
   linearly transforming the combined representation of the product as a function of time into a representation of the product as a function of frequency;
   performing, by means of a digital computer, an inverse Fourier transform on the combined representation of the product as a function of frequency, resulting in a time-domain representation of said stored representations having a real and an imaginary part;
   mathematically multiplying the real part of said time-domain representation times the cosine of a time function;
   mathematically multiplying the imaginary part of said time-domain representation times the sine of said time function; and
   mathematically adding the multiplied real and imaginary parts, the result of said addition indicating the delay times between the source vibrations and the sensed reflections of the vibrations.

22. A method as claimed in claim 17 wherein the transforming step comprises:
   linearly transforming the combined representation of the product as a function of time into a representation of the product as a function of frequency;
   performing, by means of a digital computer, an inverse Fourier transform on the combined representation of the product as a function of frequency, resulting in a time-domain representation of said stored representations having a real and an imaginary part;
   mathematically multiplying the real part of said time-domain representation times the cosine of a time function;
   mathematically multiplying the imaginary part of said time-domain representation times the sine of said time function; and
   mathematically adding the multiplied real and imaginary parts, the result of said addition indicating the delay times between the source vibrations and the sensed reflections of the vibrations.

23. A method for obtaining seismic vibrator reflection data concerning the location of subsurface geological formations, comprising the steps of:
   sinusoidally vibrating the earth with source vibrations having a frequency which is linearly increasing with time from a first frequency limit, $q_1$, which is associated with a first time, $t_1$, to a second, higher, frequency limit, $q_2$, which is associated with a second time, $t_2$;
   sensing over time reflections of the source vibrations from subsurface geological formations;
   mathematically multiplying over the time interval between $t_1$ and $t_2$ the amplitude of the source vibrations by the amplitude of the sensed reflections;
   storing, in computer-readable form, the product of the amplitude of the source vibrations and the amplitude of the sensed reflections in association with the source vibration frequency associated with each product, such that a first representation of said products as a function of source vibration is stored;
   calculating, in computer-readable form, a second representation of the product of the amplitude of the source vibrations and the amplitude of the sensed reflections as a function of negative values of source vibration frequency between $-q_1$ and $-q_2$ by sequentially associating the negative values of source vibration frequency with the product values of the first representation such that the negative values of source vibration frequency sequentially decrease from the negative of the value of frequency associated with the second, higher, frequency limit, to the negative of the value of frequency associated with the first frequency limit;
   mathematically combining the first representation, the second representation, and the value of zero for all other values of source vibration frequency into a combined representation, which is a function of source vibration frequency, whereby the first representation is phase consistent with the second representation;
   mathematically transforming the combined representation of the product as a function of source vibration frequency into a time domain representation of said waveform indicating the delay frequencies between the source vibrations and the sensed reflections of the vibrations;
   and displaying the results of the transforming step in a form adapted to geophysical analysis.

24. A method for obtaining seismic vibrator reflection data concerning the location of subsurface geological formations, comprising the steps of:
   sinusoidally vibrating the earth with source vibrations having a frequency which is linearly increasing with time from a first frequency limit, $q_1$, which is associated with a first time, $t_1$, to a second, higher, frequency limit, $q_2$, which is associated with a second time, $t_2$;

sensing over time reflections of the source vibrations from subsurface geological formations;

mathematically multiplying over the time interval between $t_1$ and $t_2$ the amplitude of the source vibrations by the amplitude of the sensed reflections;

storing, in computer-readable form, the product of the amplitude of the source vibrations and the amplitude of the sensed reflections in association with the source vibration frequency associated with each product, such that a first representation of said products as a function of source vibration is stored;

mathematically combining the first representation with the value of zero for all other values of source vibration frequency into a combined representation, which is a function of source vibration frequency;

mathematically transforming the combined representation of the product as a function of source vibration frequency into a time domain representation of said waveform indicating the delay frequencies between the source vibrations and the sensed reflections of the vibrations;

and displaying the results of the transforming step in a form adapted to geophysical analysis.

25. A method for obtaining seismic vibrator reflection data concerning the location of subsurface geological formations, comprising the steps of:

sinusoidally vibrating the earth with source vibrations having a frequency which is linearly decreasing with time from a first frequency limit, $-q_2$, which is associated with a first time, $-t_1$, to a second, lower, frequency limit, $-q_1$, which is associated with a second time, $-t_2$;

sensing over time reflections of the source vibrations from subsurface geological formations;

mathematically multiplying over the time interval between $-t_1$ and $-t_2$ the amplitude of the source vibrations by the amplitude of the sensed reflections;

storing, in computer-readable form, the product of the amplitude of the source vibrations and the amplitude of the sensed reflections in association with the source vibration frequency associated with each product, such that a first representation of said products as a function of source vibration is stored;

calculating, in computer-readable form, a second representation of the product of the amplitude of the source vibrations and the amplitude of the sensed reflections as a function of positive values of source vibration frequency time between $+q_1$ and $+q_2$ by sequentially associating the positive values of source vibration frequency with the product values of the first representation such that the positive values of source vibration frequency sequentially increase from the negative of the value of frequency associated with the second, higher, frequency limit, to the negative of the value of frequency associated with the first frequency limit;

mathematically combining the first representation, the second representation, and the value of zero for all other values of source vibration frequency into a combined representation, which is a function of source vibration frequency, whereby the first representation is phase consistent with the second representation;

mathematically transforming the combined representation of the product as a function of source vibration frequency into a time domain representation of said waveform indicating the delay frequencies between the source vibrations and the sensed reflections of the vibrations;

and displaying the results of the transforming step in a form adapted to geophysical analysis.

26. A method for obtaining seismic vibrator reflection data concerning the location of subsurface geological formations, comprising the steps of:

sinusoidally vibrating the earth with source vibrations having a frequency which is linearly decreasing with time from a first frequency limit, $-q_2$, which is associated with a first time, $-t_1$, to a second, lower, frequency limit, $-q_1$, which is associated with a second time, $-t_2$;

sensing over time reflections of the source vibrations from subsurface geological formations;

mathematically multiplying over the time interval between $-t_1$ and $-t_2$ the amplitude of the source vibrations by the amplitude of the sensed reflections;

storing, in computer-readable form, the product of the amplitude of the source vibrations and the amplitude of the sensed reflections in association with the source vibration frequency associated with each product, such that a first representation of said products as a function of source vibration is stored;

mathematically combining the first representation with the value of zero for all other values of source vibration frequency into a combined representation, which is a function of source vibration frequency;

mathematically transforming the combined representation of the product as a function of source vibration frequency into a time domain representation of said waveform indicating the delay frequencies between the source vibrations and the sensed reflections of the vibrations;

and displaying the results of the transforming step in a form adapted to geophysical analysis.

27. A method as claimed in claims 21, wherein the transforming step comprises:

performing, by means of a digital computer, an inverse Fourier transform on the combined representation of the product as a function of source vibration frequency, resulting in a time-domain representation of said stored representation having a real and imaginary part;

mathematically multiplying the real part of said time-domain representation times the cosine of a time function;

mathematically multiplying the imaginary part of said time-domain representation times the sine of said time function; and mathematically adding the multiplied real and imaginary parts, the result of said addition indicating the delay times between the source vibrations and the sensed reflections of the vibrations.

28. A method as claimed in claims 24, wherein the transforming step comprises:

performing, by means of a digital computer, an inverse Fourier transform on the combined representation of the product as a function of source vibration frequency, resulting in a time-domain representation of said stored representation having a real and imaginary part;

mathematically multiplying the real part of said time-domain representation times the cosine of a time function;

mathematically multiplying the imaginary part of said time-domain representation times the sine of said time function; and mathematically adding the multiplied real and imaginary parts, the result of said addition indicating the delay times between the source vibrations and the sensed reflections of the vibrations.

29. A method as claimed in claims 25, wherein the transforming step comprises:

performing, by means of a digital computer, an inverse Fourier transform on the combined representation of the product as a function of source vibration frequency, resulting in a time-domain representation of said stored representation having a real and imaginary part;

mathematically multiplying the real part of said time-domain representation times the cosine of a time function;

mathematically multiplying the imaginary part of said time-domain representation times the sine of said time function; and mathematically adding the multiplied real and imaginary parts, the result of said addition indicating the delay times between the source vibrations and the sensed reflections of the vibrations.

30. A method as claimed in claims 26, wherein the transforming step comprises:

performing, by means of a digital computer, an inverse Fourier transform on the combined representation of the product as a function of source vibration frequency, resulting in a time-domain representation of said stored representation having a real and imaginary part;

mathematically multiplying the real part of said time-domain representation times the cosine of a time function;

mathematically multiplying the imaginary part of said time-domain representation times the sine of said time function; and mathematically adding the multiplied real and imaginary parts, the result of said addition indicating the delay times between the source vibrations and the sensed reflections of the vibrations.

31. A method as claimed in claims 1, 3, 14, 15, 21, 22, 27, 28, 29 or 30 wherein:

the sensing step is performed at a plurality of surface locations.

32. A method as claimed in claims 1, 3, 14, 15, 21, 22, 27, 28, 29 or 30 wherein:

the sensing step is performed at a plurality of surface locations;

and further comprising, sampling the sensed reflections at a plurality of points in time, prior to the multiplication of the amplitude of the source vibrations by the amplitude of the sensed reflections.

33. A method as claimed in claims 1, 3, 14, 15, 21, 22, 27, 28, 29 or 30 wherein:

the sensing step is performed at a plurality of surface locations;

and further comprising:

sampling the amplitude of the sensed reflections at a plurality of points in time; and sampling the products of the amplitude of the source vibrations and the sampled sensed reflections prior to the transforming step.

34. A method as claimed in claims 1, 3, 14, 15, 21, 22, 27, 28, 29 or 30 wherein:

the sensing step is performed at a plurality of surface locations;

and further comprising:

sampling the amplitude of the sensed reflections at a plurality of points in time, prior to the multiplication of the amplitude of the source vibrations by the amplitude of the sensed reflections;

sampling the products of the amplitude of the source vibrations and the sampled sensed reflections prior to the transforming step; and storing the products of the sampled amplitudes of the source vibrations and the sampled sensed reflections, for each surface sensing location, in such a manner that said products may be resampled, and that the transforming and displaying steps may be performed on the new sample of said products, as required for geophysical analysis.

35. A method as claimed in claims 1, 3, 14, 15, 21, 22, 27, 28, 29 or 30 further comprising:

filtering the waveform representing the products of the amplitude of the source vibrations and the sensed reflections, prior to the transforming step, to reduce the amplitude of high frequency modulations of said waveform unnecessary for indicating the delay times between the source vibrations and sensed reflections of the vibrations.

36. A method as claimed in claims 1, 3, 14, 15, 21, 22, 27, 28, 29 or 30 further comprising:

filtering the time-domain representation resulting from the transforming step to reduce the amplitude of high frequency modulations of said representation unnecessary for indicating the delay times between the source vibrations and the sensed reflections of the vibrations.

37. A method as claimed in claims 1, 3, 14, 15, 21, 22, 27, 28, 29 or 30, further comprising:

calculating, in association with all those values of source vibration frequency that are necessary to perform the inverse Fourier transform, and other than those values of source vibration frequency associated with the two representations, the value of zero, prior to performing an inverse Fourier transform on the two combined representations.

38. An apparatus for obtaining seismic vibrator reflection data concerning the location of subsurface geological strata, comprising:

a vibrator for sinusoidally vibrating the earth with source vibrations having a frequency varying linearly with time between a first frequency limit and a second frequency limit;

a plurality of means for sensing the reflections of the source vibrations from subsurface geological formations placed at a plurality of surface locations, each having as its output an electrical signal corresponding to the amplitude of the sensed reflections;

means for generating an electrical signal corresponding to the amplitude of the source vibrations;

means, responsive to the electrical signal generating means and to the sensing means, for multiplying over time the amplitude of the source vibrations by the amplitude of the sensed vibrations;

means, responsive to the multiplying means, for storing, in computer-readable form each product of the sampled amplitude of the source vibrations and the sampled amplitude of the sensed reflections in association with the frequency associated with each product, in such a manner that a first representation of the product as a function of the frequency is stored;

means, responsive to the multiplying means, for calculating, in computer-readable form, a second representation of each product of the sampled amplitude of the source vibrations and the sampled amplitude of the sensed reflections as a function of negative values of source vibration frequency between the absolute values of the first and second frequency limits of the sweep by sequentially associating the product values of the first representation with the negative values of frequency, and whereby the second representations, when viewed graphically, the appears to be a copy of the first representation that has been placed in a symmetrically located window in the opposite half-plane of the frequency axis;

means, responsive to the storing and calculating means, for mathematically combining the first representation, the second representation, and the value of zero for all other points in time into a combined representation, which is a function of frequency, whereby the first representation is phase consistent with the second representation;

means, responsive to the combining means, for transforming the stored waveform representing the products of the multiplying means into a time-domain representation indicating the delay times between the source vibrations and the sensed reflections of said vibrations; and means for displaying the time-domain representation in such a manner adapted to geophysical analysis.

39. An apparatus for obtaining seismic vibrator reflection data concerning the location of subsurface geological strata, comprising:

a vibrator for sinusoidally vibrating the earth with source vibrations having a frequency varying linearly with time between a first frequency limit and a second frequency limit;

a plurality of means for sensing the reflections of the source vibrations from subsurface geological formations placed at a plurality of surface locations, each having as its output an electrical signal corresponding to the amplitude of the sensed reflections;

means for generating an electrical signal corresponding to the amplitude of the source vibrations;

means, responsive to the electrical signal generating means and to the sensing means, for multiplying over time the amplitude of the source vibrations by the amplitude of the sensed vibrations;

means, responsive to the multiplying means, for storing, in computer-readable form each product of the sampled amplitude of the source vibrations and the sampled amplitude of the sensed reflections in association with the frequency associated with each product, in such a manner that a first representation of the product as a function of the frequency is stored;

means, responsive to the storing means, for mathematically combining the first representation with the value of zero for all other points in time into a combined representation, which is a function of frequency;

means, responsive to the combining means, for transforming the stored waveform representing the products of the multiplying means into a time-domain representation indicating the delay times between the source vibrations and the sensed reflections of said vibrations; and means for displaying the time-domain representation in such a manner adapted to geophysical analysis.

40. An apparatus as claimed in claim 38 or 39 wherein the storing and transforming means comprises:

a digital computer adapted for sampling the products stored by the storing means, and for transforming the waveform representing said sampled products into a timedomain representation indicating the delay times between the source vibrations and the sensed reflections of said vibrations.

41. An apparatus as claimed in claim 40, wherein the multiplying means comprises:

means, responsive to the sensing means and to the electrical signal generating means, for sampling the electrical signals to obtain electrical signals corresponding to the amplitude of the source vibrations and the amplitude of the sensed reflections at predetermined points in time;

means for sequentially multiplying the electrical signals corresponding to the amplitude of the source vibrations at each predetermined point in time by the electrical signal corresponding to the amplitude of each sensed reflection at said predetermined point in time.

* * * * *